US009164710B2

(12) United States Patent
Kondoh et al.

(10) Patent No.: US 9,164,710 B2
(45) Date of Patent: Oct. 20, 2015

(54) SERVICE PROVIDING SYSTEM AND SERVICE PROVIDING METHOD

(71) Applicants: Naritake Kondoh, Kanagawa (JP);
Shohta Suzuki, Kanagawa (JP);
Shohichi Naitoh, Kanagawa (JP);
Sachiko Takeuchi, Tokyo (JP)

(72) Inventors: Naritake Kondoh, Kanagawa (JP);
Shohta Suzuki, Kanagawa (JP);
Shohichi Naitoh, Kanagawa (JP);
Sachiko Takeuchi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/332,545

(22) Filed: Jul. 16, 2014

(65) Prior Publication Data

US 2015/0029535 A1    Jan. 29, 2015

(30) Foreign Application Priority Data

Jul. 26, 2013   (JP) .................................. 2013-155172
Jul. 26, 2013   (JP) .................................. 2013-156050

(51) Int. Cl.
*H04N 1/04*     (2006.01)
*G06F 3/12*     (2006.01)
*G06F 21/60*    (2013.01)

(52) U.S. Cl.
CPC ............ *G06F 3/1222* (2013.01); *G06F 3/1238* (2013.01); *G06F 3/1256* (2013.01); *G06F 3/1288* (2013.01); *G06F 21/608* (2013.01)

(58) Field of Classification Search
CPC ... G06F 3/1222; G06F 3/1238; G06F 3/1256; G06F 3/1288
USPC .................................. 358/1.14, 1.9, 474, 482
See application file for complete search history.

(56) References Cited

U.S. PATENT DOCUMENTS

| | | | |
|---|---|---|---|
| 8,699,049 B2 * | 4/2014 | Sugiyama | ..................... 358/1.14 |
| 2008/0244756 A1 * | 10/2008 | Kitada | ............................ 726/28 |
| 2010/0306646 A1 | 12/2010 | Fukase | |
| 2013/0194633 A1 | 8/2013 | Takatsu et al. | |
| 2013/0198211 A1 | 8/2013 | Kohkaki et al. | |
| 2013/0198806 A1 | 8/2013 | Takatsu et al. | |
| 2014/0078527 A1 | 3/2014 | Ono | |
| 2014/0122349 A1 | 5/2014 | Takatsu et al. | |
| 2014/0123239 A1 | 5/2014 | Fukuda et al. | |

FOREIGN PATENT DOCUMENTS

| | | |
|---|---|---|
| JP | 2002-254754 | 9/2002 |
| JP | 2003-076515 | 3/2003 |
| JP | 2010-278495 | 12/2010 |
| JP | 2013-178748 | 9/2013 |
| JP | 2013-242848 | 12/2013 |
| JP | 2013-257859 | 12/2013 |
| JP | 2014-059696 | 4/2014 |
| JP | 2014-089678 | 5/2014 |
| JP | 2014-089680 | 5/2014 |
| JP | 2014-112354 | 6/2014 |

* cited by examiner

*Primary Examiner* — Houshang Safaipour
(74) *Attorney, Agent, or Firm* — IPUSA, PLLC

(57) ABSTRACT

A service providing system that provides a service to a service using apparatus includes a management information storage unit that stores management information associating service identification information of the service, user identification information of a user using the service, and device identification information of the service using apparatus; an authentication unit that authenticates user authentication information for user authentication and/or device authentication information for device authentication acquired from the service using apparatus; a service identification unit that identifies the service associated with the authentication information based on the management information and the authentication information that has been authenticated; and an execution unit that executes a process according to a use request for the identified service acquired from the service using apparatus. The execution unit determines a content of a predetermined output request acquired from the service using apparatus and controls output of data according to the output request.

20 Claims, 21 Drawing Sheets

FIG.4

| LICENSE TYPE | ID | REGISTRATION CODE | REGISTERED STATUS |
|---|---|---|---|
| TENANT | 10000 | AAA | REGISTERED |
| TENANT | 10001 | AAB | REGISTERED |
| TENANT | 10002 | AAC | NOT REGISTERED |
| PRINT SERVICE | 20000 | — | REGISTERED |
| PRINT SERVICE | 20001 | — | REGISTERED |
| PRINT SERVICE | 20002 | — | NOT REGISTERED |
| DELIVERY SERVICE | 30000 | — | REGISTERED |
| DELIVERY SERVICE | 30001 | — | REGISTERED |
| DELIVERY SERVICE | 30002 | — | NOT REGISTERED |
| ... | ... | ... | ... |

FIG.5

| TENANT ID | NAME | SERVICE ID | SERVICE TYPE | VALID TERM | EXTERNAL SERVICE | EXTERNAL SERVICE | ADDRESS INFORMATION | REGION INFORMATION |
|---|---|---|---|---|---|---|---|---|
| 10000 | COMPANY A | 20000 | PRINT SERVICE | 1 YEAR | ONLINE STORAGE A | ONLINE STORAGE B | A@aaa.com | JAPAN |
| | | 20001 | PRINT SERVICE | 1 YEAR | | | | |
| | | 30000 | DELIVERY SERVICE | 1 YEAR | | | | |
| 10001 | COMPANY B | 30001 | DELIVERY SERVICE | 1 YEAR | ONLINE STORAGE A | — | A@bbb.com | U.S.A. |
| ... | ... | ... | ... | ... | ... | ... | ... | ... |

FIG.6

| TENANT ID | LOGIN | | IN-HOUSE AUTHENTICATION | ONLINE STORAGE A | | ONLINE STORAGE B | | | ADDRESS INFORMATION |
|---|---|---|---|---|---|---|---|---|---|
| | USER ID | PASSWORD | USER ID | ACCOUNT | PASSWORD | ACCOUNT | AUTHORIZA-TION TOKEN | SCOPE | |
| 10000 | YAMADA | 123 | Yamada | YYamada | 1234 | yamada | aaaaa | aa, bb | A@aaa.com |
| | SATOH | 456 | SatohY | Sato | 4567 | sato | bbbbb | aa | B@aaa.com |
| | SUZUKI | 789 | SuzukiK | SUZUKI | 7890 | Suzuki | ccccc | bb, cc | C@aaa.com |
| 10001 | SUZUKI | 111 | — | TSuzuki | 1111 | — | — | — | A@bbb.com |
| | SASAKI | 222 | — | SASAKI | 222 | — | — | — | D@bbb.com |
| ... | ... | ... | ... | ... | ... | ... | ... | ... | ... |

FIG.7

| TENANT ID | DEVICE ID | SERVICE ID | SERVICE TYPE | START DATE | END DATE | ... |
|---|---|---|---|---|---|---|
| 10000 | 1 | 20000 | PRINT SERVICE | 2012/1/1 | 2012/12/31 | |
| | | 30000 | DELIVERY SERVICE | 2012/6/1 | 2013/5/31 | |
| | 2 | 20001 | PRINT SERVICE | 2012/6/1 | 2013/5/31 | |
| 10001 | 3 | 30001 | DELIVERY SERVICE | 2013/1/1 | 2013/12/31 | |
| ... | ... | ... | ... | ... | ... | ... |

FIG.8

| EXTERNAL SERVICE ID | SERVICE NAME | CLIENT ID | CLIENT SECRET | PRODUCT NAME | SCOPE | | AUTHORIZATION DESTINATION URL | REDIRECT DESTINATION URL |
|---|---|---|---|---|---|---|---|---|
| 001 | ONLINE STORAGE A | | | | | | | |
| 002 | ONLINE STORAGE B | ABCDE | XXXXX | Servece | aa | | http://www.001.com/auth | http://www.XXX.com/callback |
| | | | | | bb | | | |
| | | | | | cc | | | |
| ... | ... | ... | ... | ... | ... | | ... | ... |

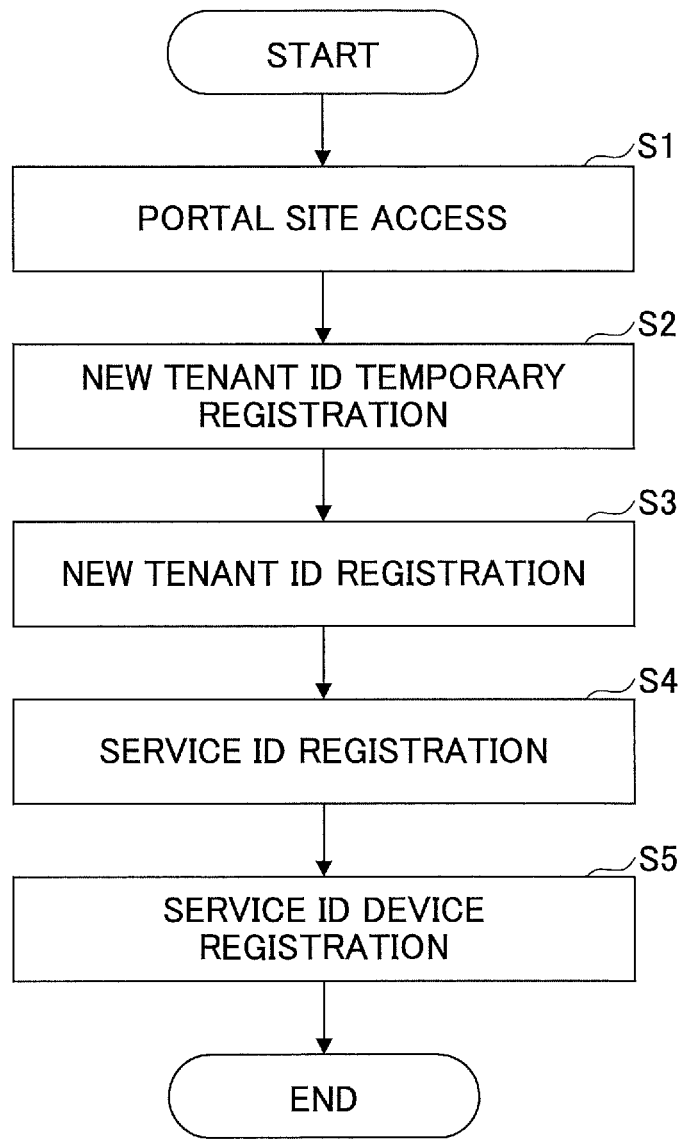

FIG.10

△△△
FILE (F) EDIT (E) VIEW (V) HISTORY (S) BOOKMARK (B) TOOL (T) HELP (H)
⬆ ⬅ 🕐 ↻ www.xxxxx.co.jp ☆▼
⬇
○○○ start.○○○ ✕
1010

NEW REGISTRATION

TERMS — ENTER — CONFIRM — CONFIRM — ENTER USER — CONFIRM — REGISTRATION
OF      ORGANIZATION  ENTERED    EMAIL     INFORMATION   ENTERED    COMPLETED
SERVICE INFORMATION   INFORMATION                        INFORMATION
■         □             □          □           □            □          □

SELECT YOUR COUNTRY OR REGION AND READ TERMS OF SERVICE ...

COUNTRY   [JAPAN  ▼]～1011
/REGION

TERMS OF SERVICE:

┌──────────────────────┐
│                      │
│        1012          │
│                      │
│                      │
└──────────────────────┘

1013～☑ AGREE

[ NEXT ]  [ CANCEL ]

SERVICE PROVIDING SYSTEM AND SERVICE PROVIDING METHOD

BACKGROUND OF THE INVENTION

1. Field of the Invention

The present invention relates to a service providing system and a service providing method.

2. Description of the Related Art

Image forming apparatuses such as printers having test print functions for preventing wasteful printing upon printing an image are known. According to such test print function, when multiple copies of a document are to be printed, for example, test printing of one copy is executed (e.g. see Japanese Laid-Open Patent Publication No. 2002-254754).

Also, in printing an image at an image forming apparatus such as a printer, a technique is known for simulating a result of printing the image on a print medium such as paper and displaying a preview of the print result before printing (e.g. see Japanese Laid-Open Patent Publication No. 2010-278495).

SUMMARY OF THE INVENTION

According to one embodiment of the present invention, a service providing system is provided that includes one or more information processing apparatuses and is configured to provide a service to a service using apparatus connected to the service providing system via a network. The service providing system includes a management information storage unit configured to store management information including an association between service identification information of the service, user identification information of a user using the service, and device identification information of the service using apparatus; an authentication unit configured to execute an authentication process using authentication information acquired from the service using apparatus, the authentication information including at least one of user authentication information used for user authentication and device authentication information used for device authentication; a service identification unit configured to identify the service associated with the authentication information based on the management information and the authentication information that has been authenticated by the authentication unit; and an execution unit configured to execute a process according to a use request for the service identified by the service identification unit upon acquiring the use request for the service from the service using apparatus. The execution unit determines a content of a predetermined output request acquired from the service using apparatus and controls output of data according to the output request.

BRIEF DESCRIPTION OF THE DRAWINGS

FIG. 4 is a table illustrating an exemplary data configuration of license information;

FIG. 5 is a table illustrating an exemplary data configuration of tenant information;

FIG. 6 is a table illustrating an exemplary data configuration of user information;

FIG. 7 is a table illustrating an exemplary data configuration of device information;

FIG. 8 is a table illustrating an exemplary data configuration of external service information;

FIG. 9 is a flowchart illustrating exemplary process steps from tenant registration to service registration;

FIG. 10 illustrates an exemplary image of a terms of service screen;

DETAILED DESCRIPTION OF THE PREFERRED EMBODIMENTS

In the following, embodiments of the present invention are described with reference to the accompanying drawings.

<System Configuration>

Figure 1:
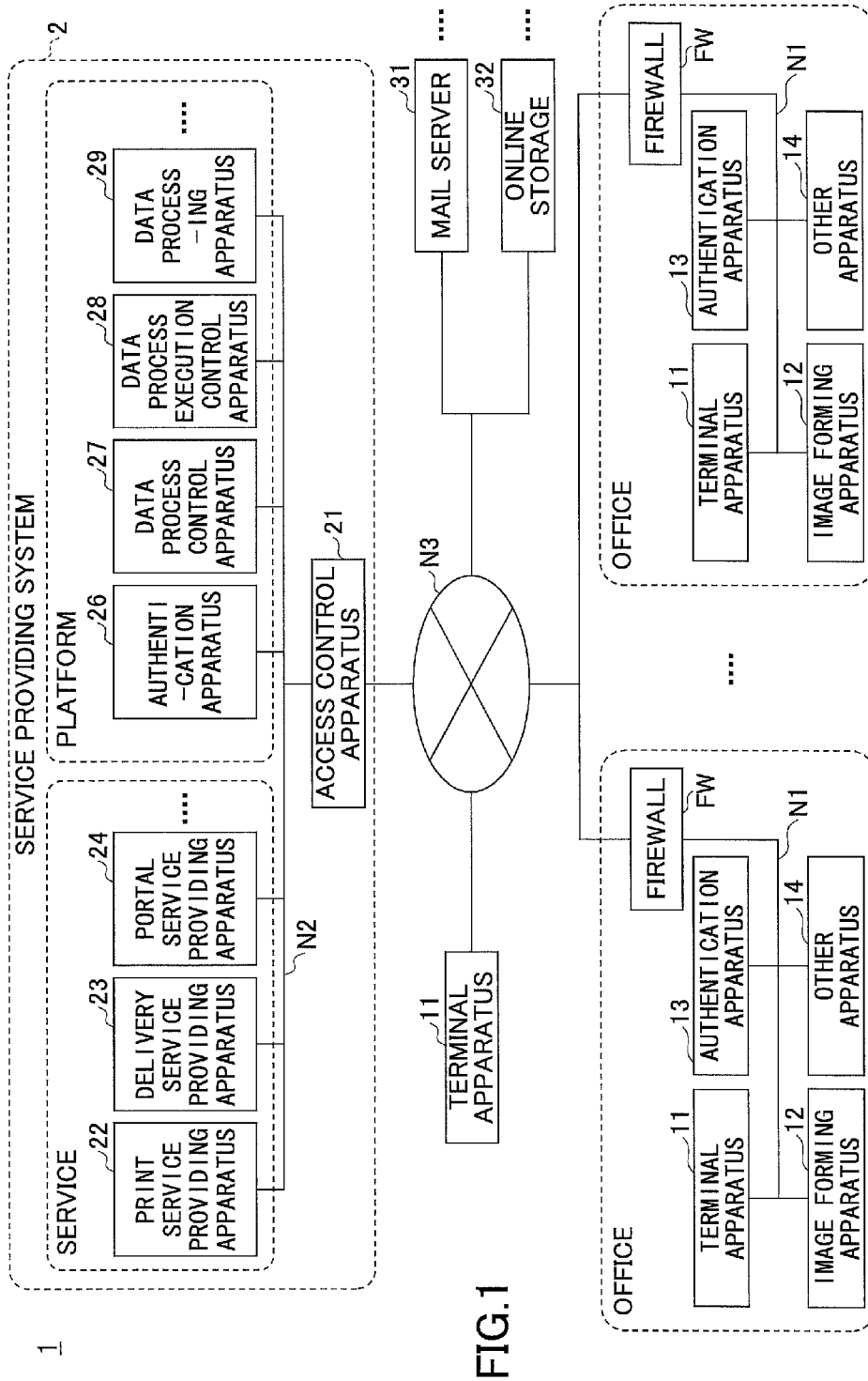
FIG. 1 illustrates an exemplary configuration of an information processing system according to an embodiment of the present invention.

FIG. 1 illustrates an exemplary configuration of an information processing system according to an embodiment of the present invention. The information processing system 1 illustrated in FIG. 1 includes, for example, a private network N1 in an office, a network N2 of a service providing system 2 represented by a cloud service, and a network N3 such as the Internet. Note that the networks N1-N3 are examples of a network environment.

The private network N1 in the office is arranged behind a firewall FW. The firewall FW is configured to block unauthorized access from an unauthorized source. An access control apparatus 21 is arranged at the network N2. The access control apparatus 21 is configured to restrict access to the network N2.

The network N1 in the office is a private network arranged at the inner side of the firewall FW. A terminal apparatus 11, an image forming apparatus 12, an authentication apparatus 13, and some other apparatus 14 may be connected to the network N1.

The terminal apparatus 11 may be implemented by an information processing apparatus (computer system) having a general OS (operating system) installed therein. The terminal apparatus 11 may be a device operable by a user such as a PC (personal computer), a tablet PC, a notebook PC, a smartphone, or a mobile phone, for example.

The image forming apparatus 12 is a device having an image forming function, such as a MFP (multifunction peripheral), a copier, a scanner, or a laser printer. The authentication apparatus 13 may be implemented by an information processing apparatus (computer system) having a general OS installed therein. The authentication apparatus 13 is configured to provide a user authentication function. The other apparatus 14 may be a device such as a projector or an electronic blackboard, for example.

Note that the terminal apparatus 11, the image forming apparatus 12, the authentication apparatus 13, and the other apparatus 14 have mechanisms for establishing wireless or wired communication. Also, note that although FIG. 1 illustrates an example where one of each of the terminal apparatus 11, the image forming apparatus 12, the authentication apparatus 13, and the other apparatus 14 are provided, there may be a plurality of each of these devices.

The service providing system 2 is a system configured by a service provider that provides a cloud service via the network N3. Note that although the present embodiment relates to an application for a cloud service, the present invention is not limited to the present embodiment but may also be applied to any service that can be provided via the network N3 such as a web service or a service provided by an ASP (application service provider), for example.

The network N2 is connected to the network N3 via the access control apparatus 21. The access control apparatus 21, a print service providing apparatus 22, a delivery service providing apparatus 23, a portal service providing apparatus 24, an authentication apparatus 26, a data process control apparatus 27, a data process execution control apparatus 28, and a data processing apparatus 29 are connected to the network N2.

The print service providing apparatus 22, the delivery service providing apparatus 23, the portal service providing apparatus 24, the authentication apparatus 26, the data process control apparatus 27, the data process execution control apparatus 28, and the data processing apparatus 29 are described in detail below.

The access control apparatus 21 and the other apparatuses such as the print service providing apparatus 22 within the service providing system 2 may be implemented by at least one information processing apparatus. That is, the apparatuses within the service providing system 2 may be implemented by one information processing apparatus or multiple information processing apparatuses.

Note that the apparatuses within the service providing system 2 may be integrated into a single computer, for example. In other words, the number of information processing apparatuses configuring the service providing system 2 is not limited to a particular number.

Also, a part or all of the apparatuses of the service providing system 2 may be implemented in a private network such as the network N1 in the office. The illustrated information processing system 1 of the present embodiment is merely one example. That is, the scope of the present invention is not limited by whether the firewall FW is implemented between the service providing system 2 and apparatuses of the network N1 in the office that are used to gain access to the service providing system 2.

The apparatuses of the service providing system 2 may be roughly categorized into those implementing service providing functions for providing various services and those implementing platform functions to be commonly used upon providing the various services.

Note that the print service providing apparatus 22, the delivery service providing apparatus 23, and the portal service providing apparatus 24 are examples of apparatuses implementing service providing functions for providing various services. The authentication apparatus 26, the data process control apparatus 27, the data process execution control apparatus 28, and the data processing apparatus 29 are examples of apparatuses implementing platform functions to be commonly used upon providing the various services.

Note that the above-described categorization of the apparatuses of the service providing system 2 is for illustrative purposes only. That is, the service providing system 2 does not necessarily have to be configured based on such categorization.

The network N3, corresponding to the Internet, for example, may have the terminal apparatus 11, a mail server 31, and an online storage 32 connected thereto. As illustrated in FIG. 1, the terminal apparatus 11 may be connected to a network other than the private network N1 in the office. The information processing system 1 illustrated in FIG. 1 includes the terminal apparatus 11 that is connected to the private network N1 in the office and the terminal apparatus 11 that is connected to the network N3 such as the Internet.

The mail server 31 performs processes related to email such as transmission and reception of a user email. The online storage 32 performs processes related to rental services of a storage area of a storage. The mail server 31 and the online storage 32 may be implemented by at least one information processing apparatus.

<Hardware Configuration>

Figure 2:
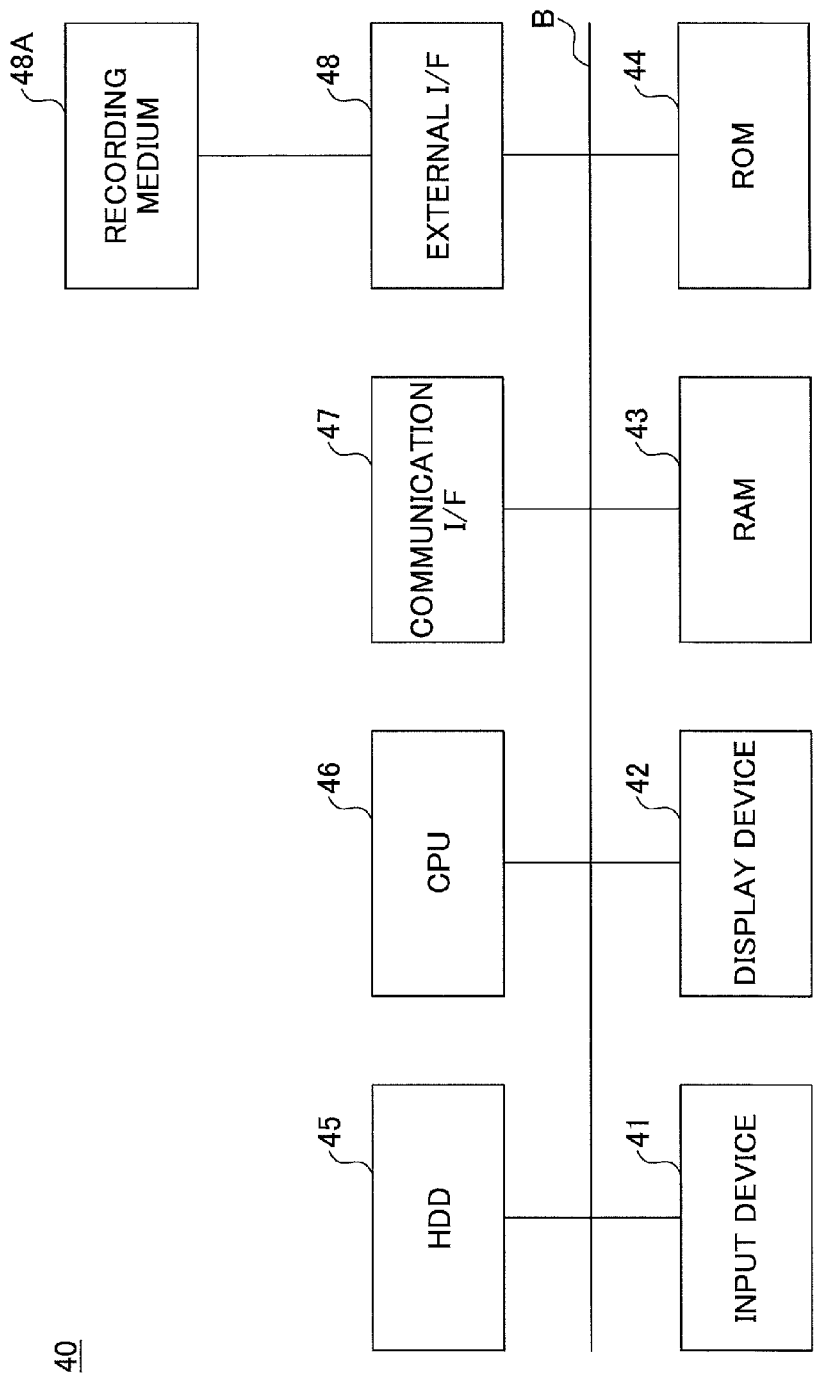
FIG. 2 illustrates an exemplary hardware configuration of a computer system according to an embodiment of the present invention.

The terminal apparatus 11 and the authentication apparatus 13 illustrated in FIG. 1 may be implemented by a computer system having a hardware configuration as illustrated in FIG. 2, for example. Similarly, the apparatuses within the service providing system 2 such as the access control apparatus 21 and the print service providing apparatus 22 as illustrated in FIG. 1 may be implemented by the computer system having the configuration as illustrated in FIG. 2, for example. Similarly, the mail server 31 and the online storage 32 as illustrated in FIG. 1 may be implemented by the computer system having the configuration as illustrated in FIG. 2, for example. FIG. 2 is a block diagram illustrating an exemplary configuration of a computer system according to an embodiment of the present invention.

The computer system 40 illustrated in FIG. 2 includes an input device 41, a display device 42, a RAM (Random Access Memory) 43, a ROM (Read-Only Memory) 44, a HDD (Hard Disk Drive) 45, a CPU (Central Processing Unit) 46, a communication I/F 47, and an external I/F 48, which are interconnected by a bus B.

The input device 41 may include a keyboard, a mouse, and a touch panel, for example, to be used by a user for inputting operation signals. The display device 42 may include a display for displaying processing results obtained by the computer system 40, for example.

The RAM 43 is a volatile semiconductor memory (storage device) for temporarily storing programs and data. The ROM 44 is a nonvolatile semiconductor memory (storage device) that can hold programs and data even after the power is turned off. The ROM 44 stores programs and data such as BIOS (Basic Input/Output System) that is executed when the computer system 40 is activated, OS settings, and network settings.

The HDD 45 is a nonvolatile storage device storing programs and data. Examples of the stored programs and data include an OS (operating system) corresponding to basic software for controlling the entire computer system 40 and application software for providing various functions in the OS.

The HDD 45 manages the stores programs and data in a predetermined file system and/or a database (DB).

The CPU 46 is a processor that controls and executes overall operations and functions of the computer system 40 by loading programs and data from storage devices such as the ROM 44 and the HDD 45 into the RAM 43 and executing relevant processes, for example.

The communication I/F 47 is an interface for connecting the computer system 40 to the networks N1 through N3. In this way, the computer system 40 may establish data communication via the communication I/F 47.

The external I/F 48 is an interface between the computer system 40 and an external device. An example of the external device is a recording medium 48A. In this way, the computer system 40 can read data from and/or write data in the recording medium 48A via the external I/F 48.

Examples of the recording medium 48A include a flexible disk, a CD (compact disk), a DVD (digital versatile disk), an SD memory card, and a USB memory (universal serial bus memory).

The computer system 40 having the above-described hardware configuration may perform various processes including the processes described below.

<Software Configuration>
<<Service Providing System>>

Figure 3:
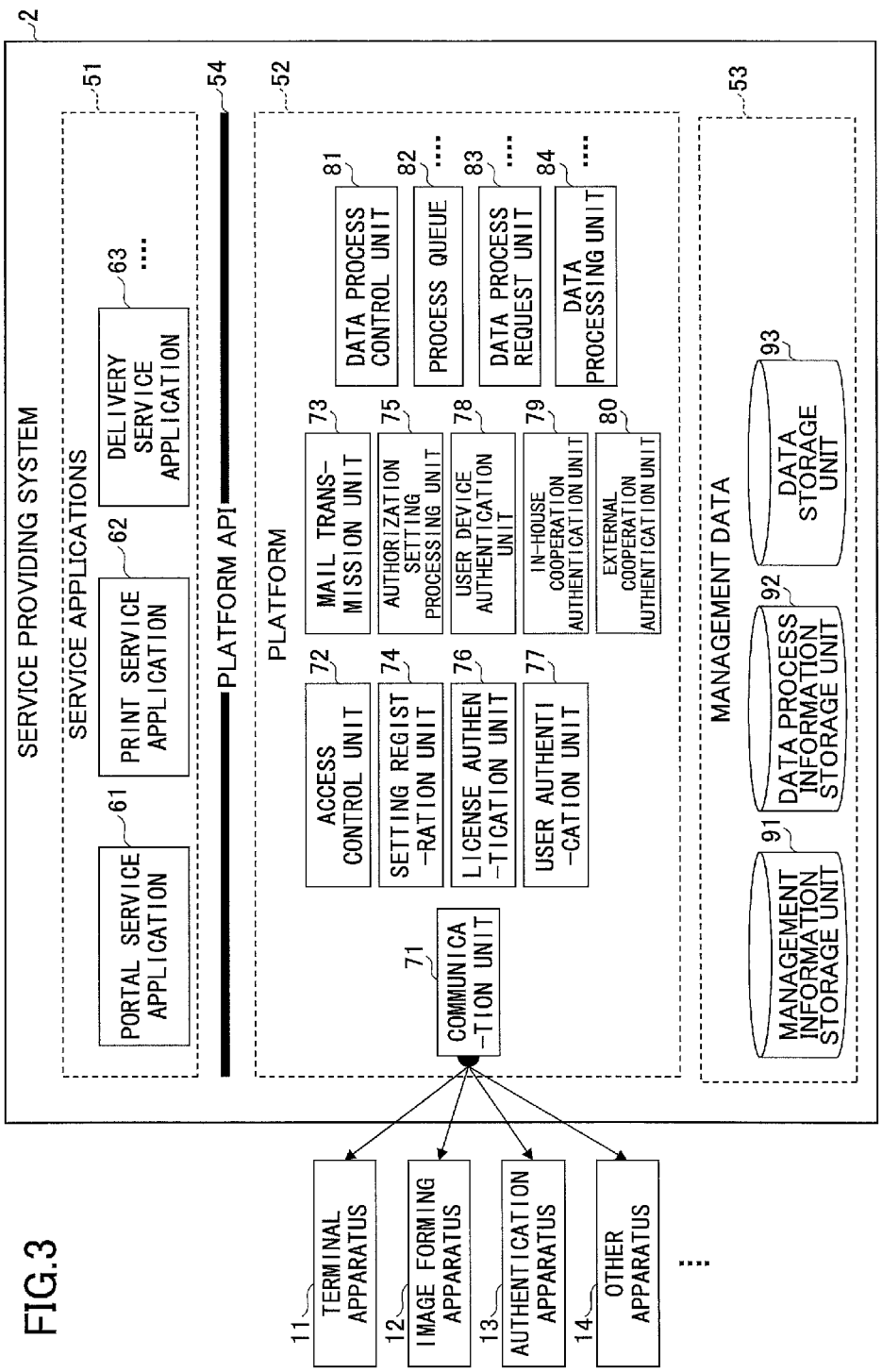
FIG. 3 is a block diagram illustrating an exemplary functional configuration of a service providing system according to an embodiment of the present invention.

FIG. 3 is a block diagram illustrating an exemplary functional configuration of the service providing system 2 according to the present embodiment. The service providing system 2 may execute corresponding programs to implement service applications 51, a platform 52, a management data storage unit 53, and a platform API (application programming interface) 54.

In the example of FIG. 3, the service applications 51 include a portal service application 61, a print service application 62, and a delivery service application 63, for example. The service applications 51 are applications having functions for providing various services.

For example, the portal service application 61 may be implemented in the portal service providing apparatus 24 illustrated in FIG. 1. The print service application 62 may be implemented in the print service providing apparatus 22. The delivery service application 63 may be implemented in the delivery service providing apparatus 23.

The portal service application 61 is configured to provide portal sites for enabling the user to use various services such as a print service or a delivery service. Also, as described below, the portal service application 61 is configured to cooperate with the platform 52 to execute a tenant registration process, a service registration process, and registration processes of various types of management information, for example.

The print service application 62 is configured to provide a print service for implementing printing by the image forming apparatus 12 by storing print data and transmitting the print data to the image forming apparatus 12, for example.

The delivery service application 63 is configured to provide a delivery service for delivering to the online storage 32 of FIG. 1, for example, image data that has been processed and transmitted from a device such as the image forming apparatus 12.

Note that the service applications 51 are not limited to the examples illustrated in FIG. 3. In some embodiments, the service applications 51 may include an application providing a service for transmitting stored image data (projection data) to the other apparatus 14 such as a projector. Also, the service applications 51 may include an application providing a service for transmitting stored image data (projection data) to the other apparatus 14 such as an electronic blackboard. As described above, the service applications 51 include an application providing some type of service to a device used by a user such as the image forming apparatus 12.

The platform API 54 is an interface that enables the service applications 51 to use the platform 52. In other words, the platform API 54 is a predefined interface that enables the platform 52 to receive requests from the service applications 51, and may be implemented by functions or classes. When the service providing system 2 is implemented by (or distributed to) multiple information processing apparatuses, a Web API that is accessible via a network may be used as the platform API 54.

In the example of FIG. 3, the platform 52 includes a communication unit 71, an access control unit 72, a mail transmission unit 73, a setting registration unit 74, an authorization setting process unit 75, a license authentication unit 76, a user authentication unit 77, a user device authentication unit 78, an in-house cooperation authentication unit 79, an external cooperation authentication unit 80, a data process control unit 81, one or more process queues 82, one or more data process request units 83, and one or more data processing units 84.

The communication unit 71 is configured to establish communication with other devices such as the image forming apparatus 12 and may be implemented in the access control apparatus 21 of FIG. 1, for example. The access control unit 72 is configured to perform access control according to various types of access requests made from devices such as the image forming apparatus 12 to the service providing system 2. The access control unit 72 may be implemented in the access control apparatus 21, for example.

The mail transmission unit 73 is configured to transmit mail and may be implemented in the authentication apparatus 26 of FIG. 1, for example. The setting registration unit 74 is configured to set up and register various types of management data to be stored in the management data storage unit 53 and may be implemented in the authentication apparatus 26, for example. The authorization setting unit 75 is configured to execute a process of setting up authorization with respect to an external service such as the online storage 32 and may be implemented in the authentication apparatus 26, for example.

The license authentication unit 76 is configured to perform authentication related to a license based on license information and tenant information (described below) to be stored by the management data storage unit 53. The license authentication unit 76 may be implemented in the authentication apparatus 26, for example. The user authentication unit 77 is configured to perform user authentication based on a login request from a device not requiring device authentication such as the terminal apparatus 11. The user authentication unit 77 may be implemented in the authentication apparatus 26, for example.

The user device authentication unit 78 is configured to perform user authentication based on a login request from a device requiring device authentication such as the image forming apparatus 12. The user device authentication unit 78 may be implemented in the authentication apparatus 26, for example.

The in-house cooperation authentication unit 79 is configured to perform user authentication in a case where the user using the image forming apparatus 12, for example, performs authentication by the authentication apparatus 13 of FIG. 1 and attempts to login using a user ID acquired from the authentication apparatus 13. The in-house cooperation authentication unit 79 may be implemented in the authentication apparatus 26, for example. The external cooperation authentication unit 80 is configured to perform an authentication process for logging into the online storage 32 of FIG. 1 and may be implemented in the authentication apparatus 26, for example.

The data process control unit 81 is configured to control a data process that is executed based on a request from the service applications 51 and may be implemented in the data process control apparatus 27, for example. The one or more process queues 82 are message queues corresponding to one or more data process types (specific processes). Request messages related to data processes from the data process control unit 81 are registered in the process queues 82. The process queues 82 may be implemented in the data process control apparatus 27, for example.

The one or more data process request units 83 are configured to monitor the process queues 82 assigned thereto and receive request messages related to data processes from their corresponding process queues 82. The data process request units 83 are configured to send requests to the data processing units 84 to execute data processes corresponding to the received messages. The data process request units 83 may be implemented in the data process execution apparatus 28, for example.

The one or more data processing units 84 are configured to execute data processes according to requests from the data process request units 83 and may be implemented in the data processing apparatus 29, for example. Examples of data processes that may be executed by the data processing units 84 include a division process for dividing up a request from the service applications 51, a data format conversion process for converting a data format, an OCR (optical character recognition) process for executing an ORC process. Further, the data processing units 84 may execute other processes such as an uploading process for uploading data in the online storage 32, for example.

Note that depending on the data process type, the data process request units 83 and the data processing units 84 may be implemented in the data process execution control apparatus 28, for example.

The management data storage unit 53 includes, for example, a management information storage unit 91, a data process information storage unit 92, and a data storage unit 93.

The management information storage unit 91 stores management information such as license information, tenant information, user information, and device information, for example. The management information storage unit 91 may be implemented in the authentication apparatus 26, for example. The data process information storage unit 92 stores information related to requested data processes. The data process information storage unit 92 may be implemented in the data process control apparatus 27, for example. The data storage unit 93 stores data such as application data, print data, and other data, for example. The data storage unit 93 may be implemented in the data process control apparatus 27, for example.

The management data stored in the management data storage unit 53 may include the following information, for example. FIG. 4 is a table illustrating an exemplary data configuration of license information. The license information includes, as data items, "license type", "ID", "registration code", and "registration status". The "license type" is information indicating the type of license. Exemplary types of licenses include tenant, print service, and delivery service licenses. The "ID" is information representing the ID of licenses that may be used for license authentication, for example. The "registration code" is information used upon registering a tenant. The "registration status" is information indicating whether license registration (ID registration) by a user has been completed (i.e. registered or not registered).

FIG. 5 is a table illustrating an exemplary data configuration of tenant information. The tenant information includes, as data items, "tenant ID", "name", "service ID", "service type", "valid term", "external service", "address information", and "region information", for example. The "tenant ID" corresponds to an ID of license information of which the license type is indicated as "tenant". The tenant ID is registered when the user performs a tenant registration process.

The "name" corresponds to a name designated by the user upon performing the tenant registration. For example, a company name or an organization name may be set up as the "name" in the tenant information. The "service ID" corresponds to an ID of license information of which the license type is indicated as "print service", "delivery service", or some other service. The service ID is registered when the user performs a service registration after completing the tenant registration.

The "service type" is information indicating the license type (service type) corresponding to the service ID. The "valid term" indicates the term of validity of the service ID. Note that the term of validity of the service ID is managed based on the time point at which the service ID is registered with a particular apparatus.

The "external service" is information indicating an external service to be used in cooperation with the service providing system 2. The online storage 32 of FIG. 1 may be an exemplary external service that may be used in cooperation with the service providing system 2. The "address information" indicates the email address of the administrator registered in connection with the tenant registration. The "region information" is information indicating the country/region in which the corresponding service is to be used. Note that the online storage 32 is an example of an external service. Examples of information items that may be used in connection with the use of the external service include an account, a password, an authorization token, and scope, which are described below.

Note that authorization refers to setting up the scope of use (authority) of services such as the types of services a user is authorized to use and resources to which the user is permitted to access, for example. For example, authorization may be set up using API authorization standard technology such as OAuth. In this case, from the perspective of using an external service such as the online storage 32 from the service providing system 2, the external service assumes the role of the OAuth service provider and the service providing system 2 assumes the role of the OAuth consumer.

FIG. 6 is a table illustrating an exemplary data configuration of user information. The user information includes, as data items, "tenant ID", "user ID" and "password" for login, "user ID" for in-house authentication, "account", "password", "authorization token", and "scope" for an online storage, and "address information", for example.

The user information manages information of users with respect to each tenant ID. The "user ID" and "password" for login correspond to authentication information to be used for user authentication when the user logs into the service providing system 2. The user ID for login may be a user name or some other information that may be used for identifying the user when the user logs into the service providing system 2. The "user ID" for in-house authentication corresponds to user identification information for identifying the user in the authentication apparatus 13 of the network N1 in the office. The user ID for in-house authentication corresponds to authentication information to be used for user authentication in a case where the user attempts to login using user identification information acquired from the authentication apparatus 13. The user ID for in-house authentication may be any information that may be used to identify a user within the authentication apparatus 13 of the network N1 in the office such as a card ID of an IC card or a terminal ID of a terminal apparatus carried by a user, for example.

The "account" and "password" for an online storage correspond to authentication information to be used upon logging into the online storage 32. The "authorization token" corresponds to information for using the online storage 32 within a specific authority range. The "scope" corresponds to information specifying the scope of use set up by an authorization process.

The "account" for online storage may be a user ID, a user name, an address for online storage, or any other information that may be used as authentication information for authenticating the user when the user logs into the online storage 32. The "address information" corresponds to an email address of the user.

FIG. 7 is a table illustrating an exemplary data configuration of device information. The device information includes, as data items, "tenant ID", "device ID", "service ID", "service type", "start date", and "end date", for example. The device information manages information of devices with respect to each tenant ID.

The "device ID" corresponds to information identifying a device that is used for device authentication. For example, a device serial number may be used as the device ID. The "service ID" and "service type" of the device information may be identical to the "service ID" and "service type" of the tenant information and are registered when a user performs service ID registration with respect to a specific device.

The "start date" corresponds to information indicating the date on which the service ID registration has been performed. The "end date" corresponds to information indicating the date on which the validity of the registered service ID is to expire. The device registered with the device information can use the service identified by the registered service ID from the start date of the service ID to the end date of the service ID.

Note that depending on the service type and license type, some services may be valid for an unlimited duration (have no substantial restrictions on the term of validity), for example. Also, it is assumed below that a device that does not have its device information registered may still be able to use functions provided by the service providing system 2 except for the services (functions) that require device authentication before they can be used.

Note that in the present embodiment, the terminal 11 is illustrated as an example of a device that does not need to have its device information registered, and the image forming apparatus 12 is illustrated as an example of a device that needs to have its device information registered.

Examples of functions that may be used at the terminal apparatus 11 include setting and registration of management data, submission of print data, and deletion. Examples of functions that may be used at the image forming apparatus 12 include acquisition of print data acquisition and transmission of delivery data.

Note that functions that require device authentication before they can be used and functions that can be used without device authentication may be arbitrarily determined by the service provider providing the functions. That is, the service provider may provide services that do not require device authentication.

FIG. 8 is a table illustrating an exemplary data configuration of external service information.

The external service information includes, as data items, "external service ID", "service name", "client ID", "client secret", "product name", "scope", "authorization destination URL" and "redirect destination URL", for example. The "external service ID" corresponds to information identifying an external service.

The "service name" corresponds to the name of an external service. The "client ID" corresponds to information issued by an external service for identifying the service providing system 2. The "client secret" corresponds to secret information for ensuring the authenticity of the client ID that may be handled like a password, for example. The "product name" corresponds to information for identifying the service applications 51. The "scope" corresponds to information specifying the scope of use for an external service. The "authorization destination URL" represents a URL of an authorization system of an external service (e.g. URL of an authorization server of the external service). The "redirect destination URL" represents a URL of the service providing system 2 to which the external service is redirected (e.g. URL of a function as an authorization client of the authorization setting process unit 75).

As can be appreciated from the above, the tenant ID is associated with services provided by the service providing system 2, users using the services, and devices that use the services. The tenant ID corresponds to information for managing users, services and devices within the service providing system 2. Also, the tenant ID corresponds to information for identifying a target (target identification information) such as a specific service to be used, a specific user that is to use the service, and a specific device to which the service is to be provided, for example.

<Process Details>

In the following, process operations of the information processing system 1 according to the present embodiment are described.

<<Process from Tenant Registration to Service Registration>>

FIG. 9 is a flowchart illustrating exemplary process steps from tenant registration to service registration. First, a user wishing to perform tenant registration (e.g. administrator of a company or an organization) acquires a tenant ID and a registration code from the service provider of the service providing system 2 (e.g. salesperson in charge of providing service).

Exemplary methods of acquiring the tenant ID and registration code include acquiring the information directly from the service provider, or accessing a dedicated site operated by the service provider from the terminal apparatus 11 of the user.

In step S1, the user operates the input device 41 of the terminal apparatus 11 so that the terminal apparatus 11 may access a portal site of the service providing system 2. Based on the user operation, the terminal apparatus 11 accesses the portal service of the service providing system 2.

Because the terminal apparatus 11 is accessing the portal site, the access control apparatus 72 of the service providing system 2 enables access from the terminal apparatus 11 to the portal service application 61.

The portal service application 61 prompts the display device 42 of the terminal apparatus 11 to display a top screen. The user may operate the input device 41 of the terminal apparatus 11 and select to make a login request or a new tenant registration request. In the following descriptions, it is assumed that the new tenant registration request has been selected by the user. Note that if the user is registered in the user information (as an administrator or other user) of the management information storage unit 91, the user may also select to make a login request by inputting a tenant ID, a user ID, and a password, for example.

When the new tenant registration request is made, in step S2, the portal service application 61 of the service providing system 2 prompts the display device 42 of the terminal apparatus 11 to display an input screen for enabling temporary registration of a tenant ID. The user operates the input device 41 of the terminal apparatus 11 to enter information for the tenant ID temporary registration and issues a temporary registration request. Based on the user operation, the terminal apparatus 11 sends the temporary registration request to the portal site of the service providing system 2.

Note that information that needs to be entered to complete the tenant ID temporary registration may include information on the country/region where services are to be used (region information) and information indicating consent to the terms of service corresponding to the country/region where the services are to be used, for example. The information to be entered for the tenant ID temporary registration may also include information items such as the tenant ID, the registration code, an email address, and a language, for example.

The service providing system 2 stores terms of service information corresponding to the country/region where the services may to be used. The portal service application 61 of the service providing system 2 controls the display device 42 of the terminal apparatus 11 to display the terms of service corresponding to the country/region entered by the user in connection with the tenant ID temporary registration and prompts the user to select whether the user agrees with the terms of service.

FIG. 10 illustrates an exemplary image including of a terms of service screen. The terms of service screen 1010 includes a selection field 1011 for selecting a country/region where services are to be used, a terms of service field 1012 displaying the terms of service corresponding to the country/region selected in the selection field 1011, and a check box 1013 for enabling the user to select whether to agree to the terms of the service.

When the temporary registration request is issued from the terminal apparatus 11 of the user, the portal service application 61 of the service providing system 2 issues a request to the license authentication unit 76 to perform a confirmation process for confirming the validity of the tenant ID and the registration code included in the information entered in connection with the tenant ID temporary registration. Upon receiving such a request, the license authentication unit 76 executes a license authentication process, and determines whether the tenant ID and registration code designated in the request for the confirmation process are stored in the license information of FIG. 4 stored by the management information storage unit 91.

If the tenant ID and registration code designated in the request for the confirmation process are stored in the license information, the license authentication unit 76 determines whether the registration status associated with the relevant tenant ID and registration code is "not registered".

If the registration status is "not registered", the license authentication unit 76 determines that the tenant ID and registration code designated in the request for the confirmation process are valid information and thereby authenticates the tenant ID (license). The license authentication unit 76 notifies the portal service application 61 of the license authentication result.

In the case where the tenant ID and the registration code are valid information, the portal service application 61 issues a request to the setting registration unit 74 to register the tenant ID, the email address, and the region information included in the information entered in connection with the tenant ID temporary registration. In turn, the setting registration unit 74 registers the tenant ID, the email address, and the region information in the tenant information of the management information storage unit 91 according to the request from the portal service application 61.

Once the above information is registered by the setting registration unit 74, in step S2, the portal service application 61 generates a registration URL corresponding to an access destination for displaying a screen for proper registration and generates an email indicating the registration URL. The portal service application 61 then issues a request to the mail transmission unit 73 to send the generated email. In turn, the mail transmission unit 73 sends the email to the email address included in the information entered in connection with the tenant ID temporary registration.

When the email is sent by the mail transmission unit 73, the portal service application 61 prompts the display device 42 of the terminal apparatus 11 to display a notification screen indicating that the email has been sent. Note that the registration URL may be managed based on its term of validity (e.g. one hour) from the time it is generated, for example. Also, for security purposes, at least one of the tenant ID and the registration code may be omitted in the email sent from the mail transmission unit 73.

Next, the user operates the input device 41 of the terminal apparatus 11 to access the registration URL indicated in the email received from the mail transmission unit 73. Based on the user operation, the terminal apparatus 11 accesses the registration URL. Note that the terminal apparatus 11 that accesses the registration URL does not necessarily have to be the same terminal apparatus 11 used to request for the temporary registration. The access control unit 72 of the service providing system 2 prompts the terminal apparatus 11 to access the portal service application 61.

The portal service application 61 verifies whether the access to the registration URL is valid (i.e. whether access is made to the generated registration URL and whether access is made within the term of validity). If the access is valid, the portal service application 61 prompts the display device 42 of the terminal apparatus 11 to display a registration screen.

The user operates the input device 41 of the terminal apparatus 11, enters information for completing proper tenant ID registration, and issues a registration request. Note that the information to be entered in the registration screen may include tenant information such as the tenant ID, name, and registration code; and user information such as a user ID and password for login and address information, for example.

Also, note that at least one of the tenant ID and registration code already entered by the user during the temporary registration may be pre-entered and displayed on the registration screen, for example. However, as described, for security purposes, at least one of the tenant ID and the registration code entered by the user are not indicated in the email notifying the registration URL.

When the registration request is issued from the terminal apparatus 11, the portal service application 61 issues a request to the license authentication unit 76 to perform a license validation process (registration process) based on the tenant ID and the registration code entered in the registration screen.

Upon receiving such a request, the license authentication unit 76 executes a license authentication process, and determines whether the tenant ID and the registration code entered in the registration screen are stored in the license information managed by the management information storage unit 91. If the tenant ID and the registration code entered in the registration screen are stored in the license information and the registration status stored in association with the above tenant ID and registration code is "not registered", the license authentication unit 76 determines that the entered tenant ID and registration code are valid information.

Upon determining the validity of the entered tenant ID and registration code, the license authentication unit 76 issues a request to the setting registration unit 74 to change the license information. In turn, the setting registration unit 74 changes the value of the registration status associated with the validated tenant ID and registration code in the license information stored by the management information storage unit 91 to "registered".

After the license validation process is completed, the portal service application 61 issues a request to the setting registration unit 74 to register the tenant information and the user information entered in the registration screen at the terminal apparatus 11 by the user. In turn, the setting registration unit 74 registers the tenant name entered as part of the tenant information in the tenant information stored by the management information storage unit 91. Also, the setting registration unit 74 registers information items such as the tenant ID, the user ID and password for login, and the address information in the user information stored by the management information storage unit 91.

After setting and registration of various items of information by the setting registration unit 74 are completed, the portal service application 61 prompts the display device 42 of the terminal apparatus 11 to display a tenant registration completion screen. Also, the portal service application 61 generates an email for notifying the completion of the tenant registration and issues a request to the mail transmission unit 73 to send the generated email. In turn, the mail transmission unit 73 sends the email notifying the completion of the tenant registration to the email address entered at the terminal apparatus 11 in connection with the tenant ID temporary registration (address information registered in the tenant information).

For example, the user may check the tenant registration completion screen displayed by the display device 42 of the terminal apparatus 11. By completing registration of the tenant ID, user ID, and password, from the next time, the user may make a login request from the top screen of the portal site. By logging in from the top screen of the portal site, the user may perform registration processes for registering tenant information, user information, and device information associated with the tenant ID.

In step S4, the user such an administrator operates the input device 41 of the terminal apparatus 11 to enter the tenant ID, user ID, and password from the top screen of the portal site, and makes a login request.

Upon receiving the login request, the portal service application 61 issues a request to the user authentication unit 77 to perform user authentication. The user authentication unit 77 determines whether the combination of the tenant ID, user ID, and password received from the terminal apparatus 11 is stored in the user information managed by the management information storage unit 91.

If the combination of the tenant ID, user ID, and password received from the terminal apparatus 11 is stored in the user information, the user authentication unit 77 authenticates the user that has made the login request. Once the user is authenticated by the user authentication unit 77, the portal service application 61 allows the user to login.

The user that has logged into the portal service application 61 is able to register the service ID of a service the user wishes to use. The portal service application 61 prompts the display device 42 of the terminal apparatus 11 to display a service registration screen for enabling the user to register a service ID. The user operates the input device 41 of the terminal apparatus 11, enters a service ID from the service registration screen displayed by the display device 42 of the terminal apparatus 11, and issues a service registration request. Based on the user operation, the terminal apparatus 11 issues the service registration request to the portal service application 61.

When the service registration request is issued from the terminal apparatus 11, the portal service application 61 refers to the license information stored by the management information storage unit 91 and selects an ID matching the service ID entered by the user from the service registration screen. The portal service application 61 acquires the license type (service type) associated with the selected ID.

Also, the portal service application 61 refers to the tenant information stored by the management information storage unit 91 and acquires region information associated with the tenant ID of the logged-in user. The portal service application 61 prompts the display device 42 of the terminal apparatus 11 to display the terms of service corresponding to the acquired license type and region information, and prompts the user to select whether the user agrees with the terms of service.

Thus, the service providing system 2 stores terms of service information corresponding to each service type (license type) and each country/region where the services may be used. In this way, the portal service application 61 may control the display of the terms of service according to the region information entered by the user in connection with the tenant ID temporary registration and the service type of the service designated in the service registration request, and prompt the user to select whether the user agrees to the relevant terms of service.

The user operates the input device 41 of the terminal apparatus 11 to select to agree to the terms of service. If the user selects to agree to the terms of service, the portal service application 61 issues a request to the license authentication unit 76 to perform a service registration process based on the tenant ID of the logged-in user and the service ID entered by the logged-in user from the service registration screen.

The license authentication unit 76 determines whether the service ID entered from the service registration screen is stored as an ID in the license information managed by the management information storage unit 91. If the service ID entered from the service registration screen is stored as an ID in the license information, the license authentication unit 76 determines that the entered service ID is valid (authenticates the service ID).

Upon determining the validity of the service ID, the license authentication unit 76 issues a request to the setting registration unit 74 to register the service ID. In turn, the setting registration unit 74 registers the service ID and service type in association with the tenant ID of the logged-in user in the tenant information managed by the management information storage unit 91.

In step S5, the user such as an administrator performs a device registration for a service ID. The user operates the input device 41 of the terminal apparatus 11 to prompt the display device 42 of the terminal apparatus 11 to display a device registration screen. The user operates the input device 41 of the terminal apparatus 11 to enter a service ID and a device ID of the device that may be able to use the service by the service ID, and issue a service ID device registration request.

When the service ID device registration request is issued from the terminal apparatus 11, the portal service application 61 issues a request to the license authentication unit 76 to perform a service ID device registration process based on the tenant ID of the logged-in user and the service ID and device ID entered from the device registration screen.

The license authentication unit 76 determines whether the combination of the tenant ID of the logged-in user and the service ID entered from the service registration screen is stored in the tenant information managed by the management information storage unit 91.

If the combination of the tenant ID of the logged-in user and the service ID entered from the device registration screen is stored in the tenant information, the license authentication unit 76 refers to the license information stored by the management information storage unit 91. The license authentication unit 76 determines whether the registration status associated with the service ID entered from the device registration screen is "not registered".

If the registration status is "not registered", the license authentication unit 76 issues a request to the setting registration unit 74 to perform device registration for the service ID. Note that a service ID with the registration status "not registered" corresponds to a service ID for which a device registration has not yet been performed. The setting registration unit 74 registers the tenant ID of the logged-in user and the service ID and device ID entered from the device registration screen in the device information stored by the management information storage unit 91. Also, the setting registration unit 74 refers to the tenant information stored by the management information storage unit 91, and acquires the service type and valid term associated with the tenant ID and service ID. The setting registration unit 74 registers the service type, the start date, and the end data in the device information stored by the management information storage unit 91 based on the acquired service type and valid term information.

Note that the execution date of the service ID device registration is stored as the start date. The date of expiry of the service ID calculated based on the valid term (e.g. 1 year) acquired from the tenant information and the start date is stored as the end date. However, in some embodiments, the start date may be designated in the service registration request of step S4, for example. In the case where the start date can be designated, the date designated as the start date in the service registration request is stored as the start date of the device information. When the service ID device registration is completed, the setting registration unit 74 changes the registration status associated with the service ID for which the device registration was performed to "registered" in the license information stored by the management information storage unit 91.

By implementing the process steps from tenant registration to device registration as described above, the user such as an administrator may perform tenant registration, service ID registration, and service ID device registration by accessing the service providing system 2 from the terminal apparatus 11. Accordingly, the user may easily complete necessary procedures for receiving services from a service provider. Also, the service providing system 2 may manage information on the services to be provided, the users that are to use the services, and the devices that are to use the services with respect to each tenant ID that has been subject to a license validation process.

<<User Authentication/Device Authentication Function of Service Providing System>>

Figure 11:
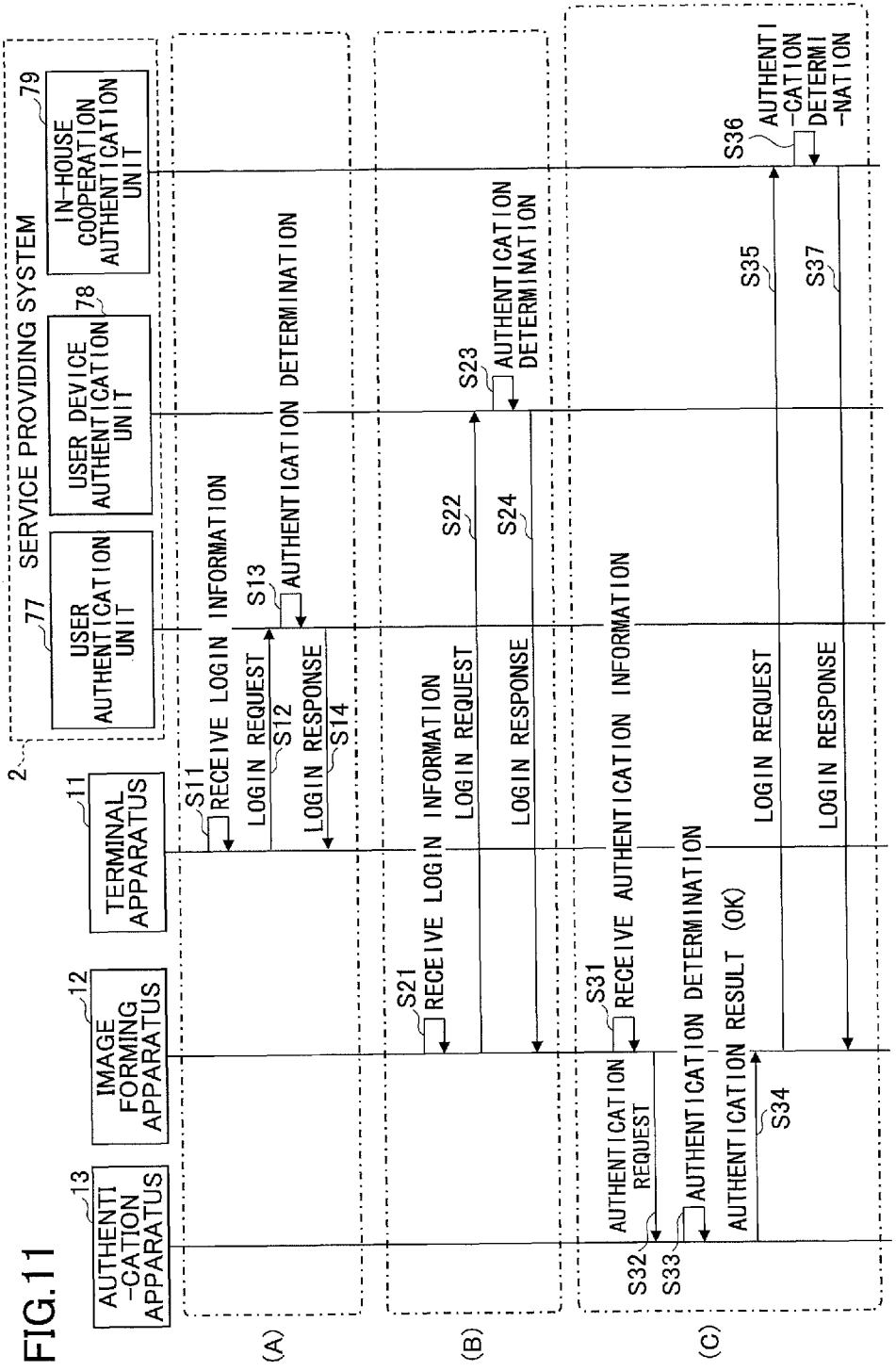
FIG. 11 is a sequence chart illustrating an exemplary user authentication/device authentication process.

FIG. 11 is a sequence chart illustrating exemplary user authentication/device authentication processes. FIG. 11 (A) illustrates user authentication from the terminal apparatus 11 that does not require device authentication. FIG. 11 (B) illustrates user authentication from the image forming apparatus 12 that requires device authentication. FIG. 11 (C) illustrates in-house cooperation authentication from the image forming apparatus 12 that requires device authentication.

As illustrated in FIG. 11 (A), when performing user authentication from the terminal apparatus 11, the user enters a tenant ID, a user ID, and a password as login information from a top screen of a portal site, for example. In step S11, the terminal apparatus 11 receives the login information entered by the user.

In step S12, the terminal apparatus 11 issues a login request to the service providing system 2 using the login information entered by the user. The access control unit 72 of the service providing system 2 issues a request to the user authentication unit 77 to perform user authentication.

In step S13, the user authentication unit 77 determines whether the login information received from the terminal apparatus 11 is included in the user information stored by the management information storage unit 91. If the login information received from the terminal apparatus 11 is included in the user information stored by the management information storage unit 91, the user authentication unit 77 determines that the user authentication has been successful. If the login information received from the terminal apparatus 11 is not included in the user information stored by the management information storage unit 91, the user authentication unit 77 determines that the user authentication has been unsuccessful.

In the case where the user authentication has been successful, the access control unit 72 allows login from the terminal apparatus 11 to the service providing system 2 (login for using a service). In step S14, the access control unit 72 sends a login response based on the result of the user authentication by the user authentication unit 77 to the terminal apparatus 11.

Referring to FIG. 11 (B) and FIG. 11 (C), when performing user authentication for logging into the service providing system 2 from the image forming apparatus 12, a user ID and a password for login may be used or a user ID for in-house authentication may be used. The image forming apparatus 12 may store settings for using the user ID and password for login and settings for using the user ID for in-house authentication. The settings for user authentication may be changed as desired. Also, the image forming apparatus 12 has a tenant ID and a device ID stored in its own storage area.

In the case where the user ID and password for login are used, the image forming apparatus 12 performs user device authentication as illustrated in FIG. 11 (B) in order to log into the service providing system 2.

In step S21, the image forming apparatus 12 displays an input screen for prompting the user to enter a user ID and a password for login. The user enters a user ID and a password for login from the input screen displayed at the image forming apparatus 12. In turn, the image forming apparatus 12 receives the user ID and password for login entered by the user.

In step S22, the image forming apparatus 12 sends the user ID and password for login entered by the user and the tenant ID and the device ID stored in its own storage area to the service providing system 2 as login information, and issues a login request. The access control unit 72 of the service providing system 2 issues a request to the user device authentication unit 78 to perform user device authentication.

In step S23, the user device authentication unit 78 determines whether the combination of the tenant ID and the device ID included in the login information received from the image forming apparatus 12 is included in the device information stored by the management information storage unit 91. If the combination of the tenant ID and the device ID included in the login information received from the image forming apparatus 12 is included in the device information stored by the management information storage unit 91, the user device authentication unit 78 determines that the device authentication has been successful. If the combination of the tenant ID and the device ID included in the login information received from the image forming apparatus 12 is not included in the device information stored by the management information storage unit 91, the user device authentication unit 78 determines that the device authentication has been unsuccessful.

Further, the user device authentication unit 78 determines whether the combination of the user ID and password for login included in the login information received from the image forming apparatus 12 is included in the user information stored by the management information storage unit 91. If the combination of the user ID and password for login included in the login information received from the image forming apparatus 12 is included in the user information stored by the management information storage unit 91, the user device authentication unit 78 determines that the user authentication has been successful. If the combination of the user ID and password for login included in the login information received from the image forming apparatus 12 is not included in the user information stored by the management information storage unit 91, the user device authentication unit 78 determines that the user authentication has been unsuccessful.

When the device authentication and the user authentication are successful, the access control unit 72 allows login from the image forming apparatus 12 to the service providing system 2 (login for using service). In step S24, the access control unit 72 sends a login response to the image forming apparatus 12 based on the results of the device authentication and the user authentication by the user device authentication unit 78.

In the case of using the user ID for in-house authentication, the image forming apparatus 12 performs in-house cooperation authentication as illustrated in FIG. 11 (C) in order to log into the service providing system 2. First, the user performs user authentication at the image forming apparatus 12. The user authentication performed at the image forming apparatus 12 may correspond to user authentication for using the image forming apparatus 12 or user authentication for using a certain function of the image forming apparatus 12. In the following, an exemplary case is described in which the authentication apparatus 13 performs user authentication using a card ID stored in a card such as an IC card carried by the user.

In step S31, the user prompts a card reader (not shown) connected to the image forming apparatus 12 to read the card ID and performs user authentication. In step S32, the image forming apparatus 12 sends the card ID read by the card reader to the authentication apparatus 13 and performs user authentication.

In step S33, the authentication apparatus 13 performs authentication determination using the card ID received from the image forming apparatus 12. The authentication apparatus 13 stores in its storage area user authentication information associating a card ID with a corresponding user ID. The authentication apparatus 13 refers to the user authentication information associating a card ID with a user ID to determine whether a user ID associated with the card ID received from the image forming apparatus 12 may be identified.

In the case where a user ID associated with the card ID could be identified, the authentication apparatus 13 determines that the user authentication has been successful. In step S34, the authentication apparatus 13 sends the authentication result (successful authentication result) together with the identified user ID to the image forming apparatus 12.

Next, the user may make a login request by selecting login to the service providing system 2 from a display screen of the image forming apparatus 12, for example. In step S35, the user makes a login request to log into the service providing system 2 from the image forming apparatus 12.

When the login request from the user to the service providing system 2 is made, the image forming apparatus 12 sends the identified user ID and the tenant ID and device ID stored in its own storage area as login information to the service providing system 2, and issues a login request. The access control unit 72 of the service providing system 2 issues a request to the in-house cooperation authentication unit 79 to perform in-house cooperation authentication.

In step S36, the in-house cooperation authentication unit 79 determines whether the combination of the tenant ID and device ID included in the login information received from the image forming apparatus 12 is included in the device information stored by the management information storage unit 91.

If the combination of the tenant ID and device ID included in the login information received from the image forming apparatus 12 is included in the device information, the in-house cooperation authentication unit 79 determines that the device authentication has been successful. If the combination of the tenant ID and device ID included in the login information received from the image forming apparatus 12 is not included in the device information, the in-house cooperation authentication unit 79 determines that the device authentication has been unsuccessful.

Further the in-house cooperation authentication unit 79 determines whether the combination of the tenant ID and the user ID for in-house authentication included in the login information received from the image forming apparatus 12 is included in the user information stored by the management information storage unit 91. If the combination of the tenant ID and the user ID for in-house authentication included in the login information received from the image forming apparatus 12 is included in the user information stored by the management information storage unit 91, the in-house cooperation authentication unit 79 determines that the device authentication has been successful.

If the combination of the tenant ID and the user ID for in-house authentication included in the login information received from the image forming apparatus 12 is not included in the user information stored by the management information storage unit 91, the in-house cooperation authentication unit 79 determines that the device authentication has been unsuccessful.

When the device authentication and the user authentication are successful, the access control unit 72 allows login from the image forming apparatus 12 to the service providing system 2 (login for using service). In step S37, the access control unit 72 sends a login response to the image forming apparatus 12 based on the results of the device authentication and the user authentication by the in-house cooperation authentication unit 79.

Note that in the case where the device authentication by the in-house cooperation authentication unit 79 has been successful but the user authentication has been unsuccessful, the service providing system 2 may prompt the image forming apparatus 12 to display an input screen for prompting the user to enter a user ID and password for login, for example.

In this case, the user may enter a user ID and a password for login from the input screen and make a login request once more. The image forming apparatus 12 may send the user ID and password for login entered by the user and the tenant ID and device ID stored in its own storage area as login information to the user device authentication unit 78 of the service providing system 2, and issue login request.

The user device authentication unit 78 determines whether the combination of the tenant ID and the user ID and password for login received from the image forming apparatus 12 are included in the user information stored by the management information storage unit 91.

If the combination of the tenant ID and the user ID and password for login received from the image forming apparatus 12 are included in the user information, the user device authentication unit 78 determines that the user authentication has been successful. In turn, the access control unit 72 allows login from the image forming apparatus 12 to the service providing system 2.

Further, the setting registration unit 74 registers the user ID for in-house authentication received from the image forming apparatus 12 in association with the tenant ID and the user ID and password for login received from the image forming apparatus 12 in the user information stored by the management information storage unit 91. By registering the user ID for in-house authentication received from the image forming apparatus 12 in association with the tenant ID and the user ID and password for login received from the image forming apparatus 12 as described above, from the next time, the user may be able to use the user ID for in-house authentication to login.

<<Data Processing Function of Service Providing System>>

In the service providing system 2, the data process control unit 81, the process queues 82, the data process request units 83, and the data processing units 84 may execute various data processes requested by a process request unit 101 of the service applications 51 in the following manner.

Figure 12:
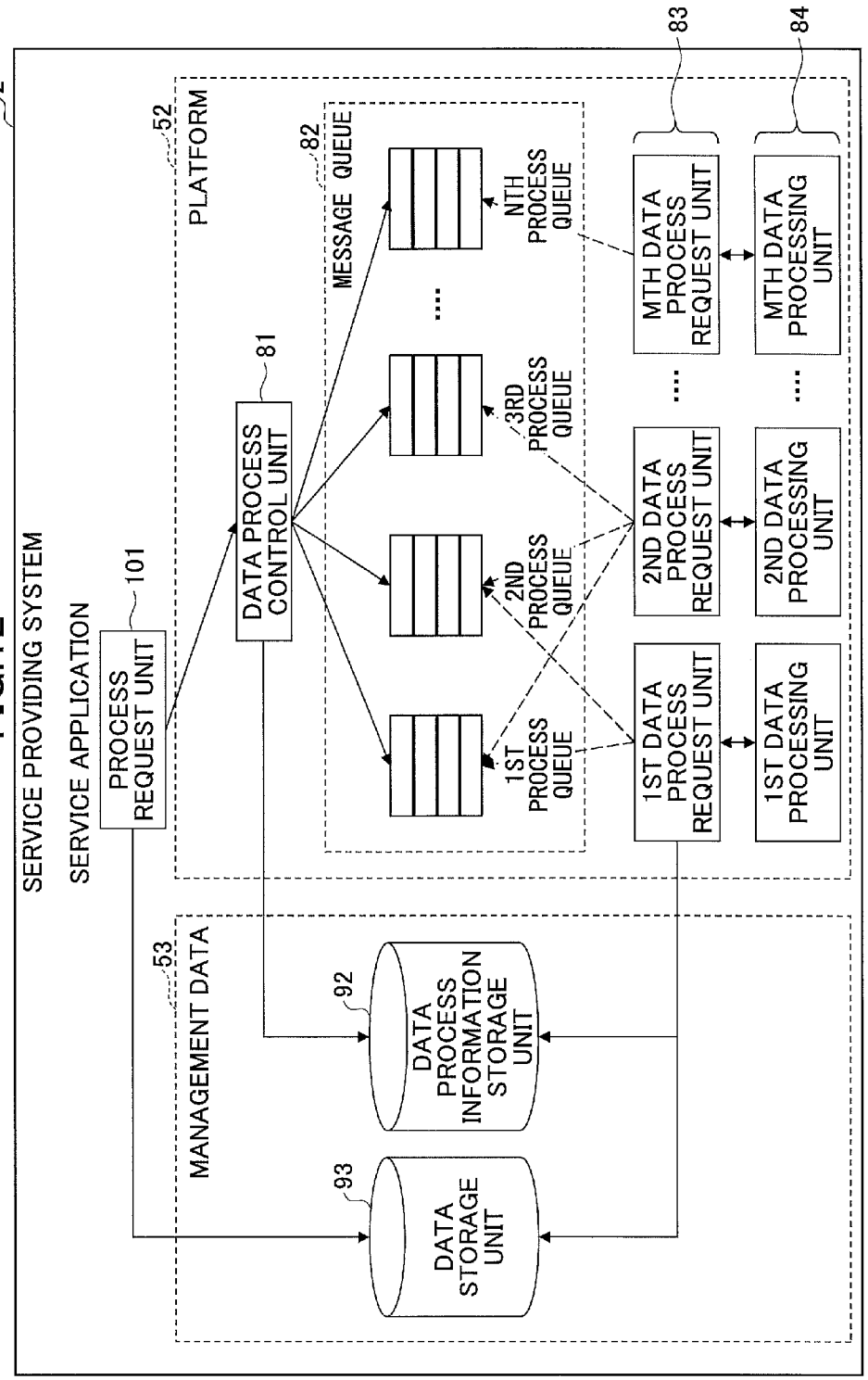
FIG. 12 illustrates an exemplary data processing function of the service providing system.

FIG. 12 illustrates an exemplary data processing function of the service providing system 2. The process request unit 101 of the service applications stores data to be processes in the data storage unit 93 of the management data storage unit 53. The processing data may be application data or image data subject to a data process, for example.

Also, the process request unit 101 transmits a data process request (referred to as "request" hereinafter) to the data process control unit 81 of the platform 52. The request to be transmitted includes the specific process (process type) of the data process and storage destination information (e.g. URL) for the processing data.

The data process control unit 81 analyzes the request received from the process request unit 101 and registers a message in the process queue (message queue) 82 according to the specific process of the data process. Note that the process queue 82 is provided for each specific process.

Also, the data process control unit 81 registers request information in the data process information storage unit 92 of the management data storage unit 53. The request information may include information items such as the storage destination of the processing data, the specific process of the data process, and the status of the request, for example.

The status of the request may include statuses such as "received", "executing", and "completed", for example. The status of the request indicates the progress of the data process. The status of the request may be set to "received" at the time the data process control unit 81 registers the request information.

The data process request units 83 monitors the one or more process queues 82 to which they are assigned. That is, the data process request units 83 monitor requests for specific processes of one or more data processes. The data process request units 83 acquire the messages that are registered in the process queues 82 they monitor.

For example, in FIG. 12, a first data process request unit 83 monitors a first process queue 82 and a second process queue corresponding to specific processes that differ from each other. Also, a second data process request unit 83 monitors first through third process queues 82 corresponding to specific processes that differ from one another. FIG. 12 illustrates an exemplary case in which the first data process request unit 83 and the second data process request unit 83 both monitor the first process queue 82 and the second process queue 82.

Note that the assignment of the process queues 82 to be monitored by the data process request units 83 may be arbitrarily set up and changed as desired. For example, the assignment of the process queues 82 to be monitored by the data process request units 83 may be set up and changed according to the frequency of the requests for the various specific processes of the data processes and the processing time.

The data process request units 83 acquire request information from the data process information storage unit 92 based on the messages acquired from the process queues 82 they monitor. The data process request units 83 prompt the data processing units 84 to execute the data processes of requests based on the storage destination of the processing data and the specific processes of the data processes included in the acquired request information.

Next, the data process request units 83 update the request information based on the execution results of the data processes executed by the data processing units 84 and registers the updated request information in the data process information storage unit 92. Updating the request information may include deleting the specific processes of the data processes that have been executed based on the requests, and changing the status of the requests, for example. Also, if request information of a data process calls for execution of a next specific process, for example, the data process request unit 83 registers a message in the process queue 82 according to the specific process of the data process.

Note that when the processing data changes as a result of having the data processing unit 84 execute the data process of a request, the data process request unit 83 registers the changed processing data after processing in the data storage unit 93. Also, the data process request unit 83 updates the request information according to information on the storage destination of the changed processing data after processing.

Figure 13:
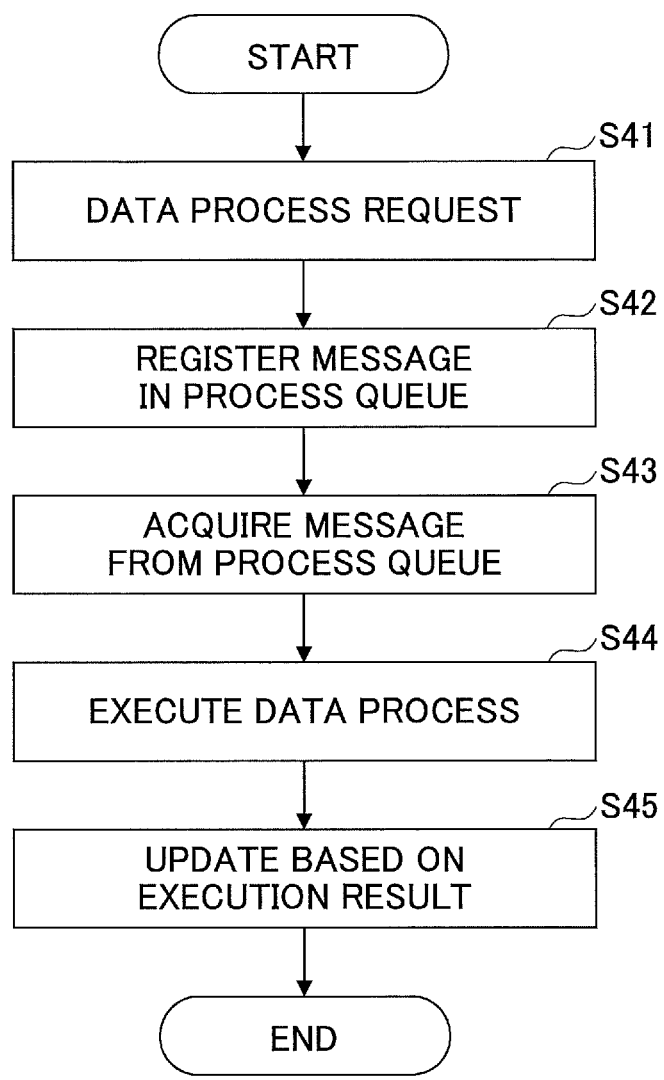
FIG. 13 is a flowchart illustrating exemplary process steps of the data processing function of the service providing system.

FIG. 13 is a flowchart illustrating exemplary process steps of a data processing function of the service providing system 2. In step S41, the process request unit 101 of the service applications 51 stores processing data in the data storage unit 93 of the management data storage unit 53. Also, the process request unit 101 transmits a request (data process request) to the data process control unit 81 of the platform 52.

In step S42, the data process control unit 81 analyzes the request and registers a message in the process queue 82 that corresponds to the specific process of the data process called by the request. Also, the data process control unit 81 registers the request information in the data process information storage unit 92 of the management data storage unit 53.

In step S43, the data process request units 83 acquire the messages registered in the process queues 82 from the process queues 82 they monitor. In step S44, the data process request units 83 acquire request information from the data process information storage unit 92 based on the acquired message. Then, the data process request units 83 prompts the data processing units 84 to execute the data processes of the requests based on the acquired request information.

In step S45, the data process request units 83 update the request information based on the execution results of the data processes executed by the data processing units 84, register the updated request information in the data process information storage unit 92, and ends the process of FIG. 13.

Note that if the request information includes a specific process of a next data process to be executed, the data process request units 83 registers a message in the process queue 82 according to the specific process of the data process, and ends the process of FIG. 13 thereafter.

In the following, examples of specific processes of data processes are illustrated. However the present invention is not limited to these examples. As a first example, the specific process of the data process may be a data format conversion process for converting the data format of processing data.

For example, the data format conversion process for converting the data format of processing data may include a data process for converting image data into PDF (portable document format) data. In the following descriptions, the specific process of the data process for converting image data into PDF data may be referred to as "image2pdf".

Also, the data format conversion process for converting the data format of processing data may include a data process for converting PDF data into PDL (page description language) data. In the following descriptions, the specific process of the data process for converting PDF data into PDL data may be referred to as "pdf2pdl".

Further, the data format conversion process for converting the data format of processing data may include a data process for converting Microsoft Office (registered trademark) document data into PDL data. In the following descriptions, the specific process of the data process for converting Office document data into PDL data may be referred to as "office2pdl".

As a second example, a specific process of a data process may include a process of dividing up one specific process of a data process into a plurality of specific processes of data processes, and converting a request into a plurality of requests to the data processing units 84 according to the divided specific processes of data processes.

For example, a data process for converting image data into PDL data may be divided into a process of converting the image data into PDF data, and a process of converting the PDF data into PDL data. In the following descriptions, the specific process of the data process for converting image data into PDL data may be referred to as "image2pdl".

For example, one of the data processing units 84 may perform a data process for dividing a request for the data process "image2pdl" into the data processes "image2pdf" and "pdf2pdl". That is, the data processing units 84 include a data processing unit 84 that performs a data process of dividing a request for one data process into a plurality of requests for data processes.

Accordingly, even when the data processing units 84 do not include a data processing unit 84 that is capable of executing the data process "image2pdl", the desired data process "image2pdl" may be executed through cooperation of the data processes "image2pdf" and "pdf2pdl".

Figure 14:
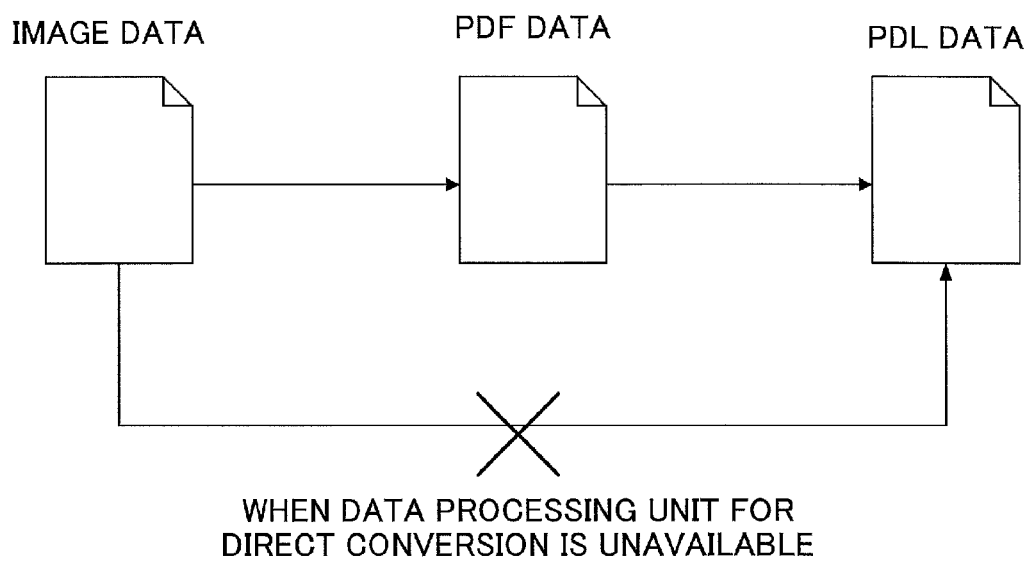
FIG. 14 illustrates a data process for dividing a specific process of one data process into multiple specific processes of data processes.

FIG. 14 conceptually illustrates a data process of dividing up one specific process of a data process into a plurality of specific processes of data processes. FIG. 14 illustrates an exemplary case where the data processing units 84 do not include a data processing unit 84 that is capable of executing the data process "image2pdf".

As illustrated in FIG. 14, even in a case where a data processing unit capable of performing the desired data process is unavailable, the desired data process "image2pdl" may be executed through cooperation of the data processes "image2pdf" and "pdf2pdl".

As can be appreciated, the service providing system 2 of the present embodiment is capable of executing a data process for dividing up one specific process of a data process into a plurality of specific processes of data processes. In this way, the service providing system 2 of the present embodiment may flexibly accommodate an increase in the types of specific processes of data processes.

Also, as a third example, a specific process of a data process may include a data process for cooperating with an external service. For example, the data process for cooperating with an external service may include a data process of issuing a request to the external cooperation authentication unit 80 to log into the online storage 32 using an account and password for online storage of a logged-in user.

Other examples of the data process for cooperating with an external service may include a data process of storing data in the logged in online storage 32, a data process of acquiring data from the logged in online storage 32, a data process for cooperating with an external storage.

<<Cooperation with Online Storage>>

Figure 15:
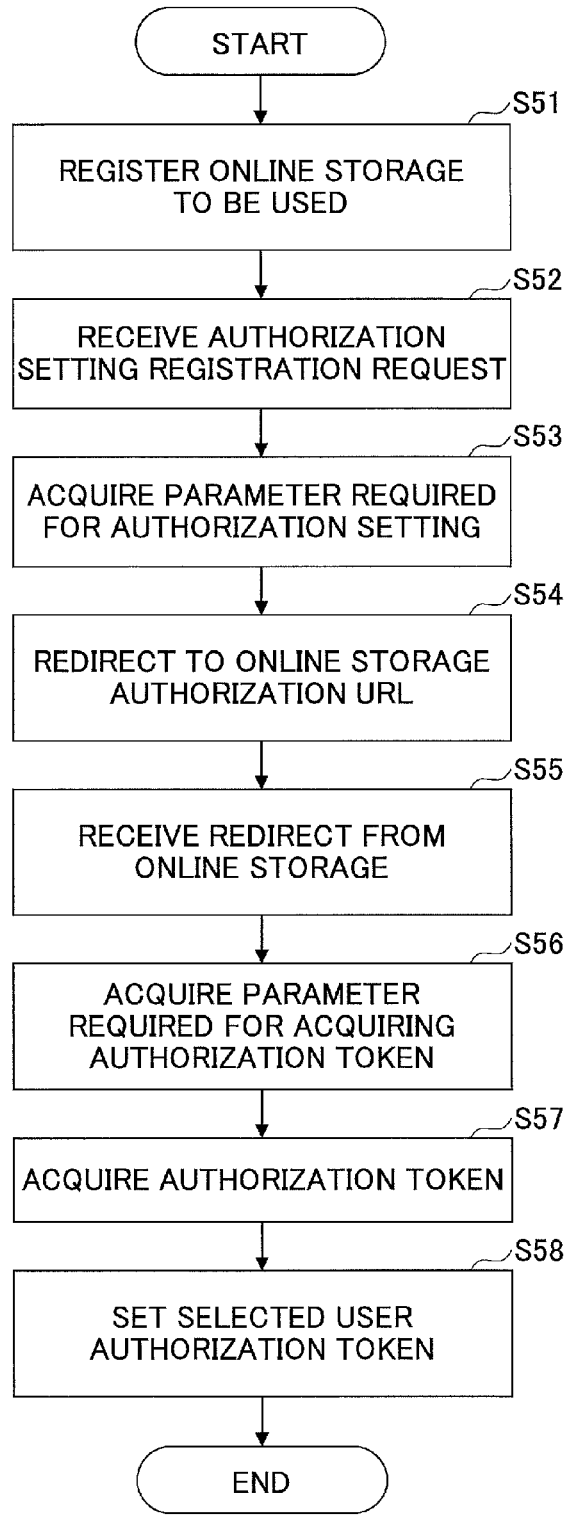
FIG. 15 is a flowchart illustrating exemplary process steps of authorization setting with respect to an online storage.

FIG. 15 is a flowchart illustrating exemplary process steps for setting up authorization with respect to an online storage. The user such as an administrator operates the input device 41 of the terminal apparatus 11 to enter a tenant ID, a user ID, and a password from the top screen of a portal site, and makes a login request. The portal service application 61 that receives the login request allows the user to login and prompts the display device 42 of the terminal apparatus 11 to display an external service registration screen.

In step S51, at the external service registration screen, the user selects the online storage (external service) 32 that the user wishes to use from a list of external services stored in the external service information of the management information storage unit 91, and makes a registration request.

The portal service application 61 that has received the registration request issues a request to the setting registration unit 74 to register the online storage 32 selected by the user. In turn, the setting registration unit 74 registers the online storage 32 selected by the user in association with the tenant ID of the logged-in user in the tenant information of the management information storage unit 91.

In step S52, the user selects from an authorization setting screen of the portal site the user ID of users to be subject to the authorization setting, the external service ID (or service name) of the external service subject to the authorization setting, and the scope to be set up for the users, and makes an authorization setting registration request. The portal service application 61 receives the authorization setting registration request.

In step S53, the portal service application 61 that has received the authorization setting registration request issues a request to the authorization setting process unit 75 to set up the authorization setting. In turn, the authorization setting process unit 75 acquires parameters necessary for the authorization setting from the external service information of the management information storage unit 91. Note that the parameters necessary for authorization setting may include the external service ID, the scope, information items associated with the selected external service ID such as a client ID and a redirect destination URL, and an arbitrary session key for maintaining a session, for example.

In step S54, the authorization setting process unit 75 that has acquired the parameters necessary for the authorization setting acquires from the external service information of the management information storage unit 91 the authorization destination URL associated with the selected external service ID. The authorization setting process unit 75 redirects a request including the parameters necessary for the authorization setting (request having the parameters necessary for the authorization setting as queries of a GET request) to the authorization destination URL from the terminal apparatus 11.

By redirecting the request from the terminal apparatus 11 to the authorization destination URL, authorization may be set up between the terminal apparatus 11 and the online storage 32. Note that after the authorization is set up, the online storage 32 is redirected to the authorization setting process unit 75, and therefore, the session at the HTTP level is terminated. Accordingly, a session key is used to maintain the same session.

The redirected online storage 32 prompts the display device 42 of the terminal apparatus 11 to display a login screen. The user operates the input device 41 of the terminal apparatus 11 to enter an account and password from the login screen, and makes a login request. The online storage 32 receives the login request.

If the login is successful, the online storage 32 prompts the display device 42 of the terminal apparatus 11 to display an authorization screen. The user may view the authorization screen, and in the case of performing authorization, the user may operate the input device 41 of the terminal apparatus 11 to press an authorization button displayed on the authorization screen, for example, to make an authorization request.

In step S55, the online storage 32 redirects an authorization code indicating that authorization has been approved and a session key from the terminal apparatus 11 to the redirect destination URL. In step S56, the authorization setting process unit 75 of the service providing system 2 receives the authorization code. Note that if the user is already logged in upon being redirected to the online storage 32, the display of the login screen may be omitted.

In step S56, the authorization setting process unit 75 that has received the authorization code acquires parameters necessary for acquiring an authorization token from the service information of the management information storage unit 91. The parameters necessary for acquiring an authorization token from the service information of the management information storage unit 91 may include the received authorization code as well as the client ID and client secret associated with the external service ID of the online storage 32 corresponding to the sender of the authorization code, for example.

In step S57, the authorization setting process unit 75 transmits the acquired client ID and client secret and the received authorization code to the online storage 32, and makes an authorization token acquisition request. The online storage 32 verifies the received authorization token and transmits the authorization token to the authorization setting process unit 75 of the service providing system 2.

In step S58, the authorization setting process unit 75 that has received the authorization token issues a request to the setting registration unit 74 to register the authorization token.

The setting registration unit 74 registers the users to be subject to the authorization setting selected from the authorization setting screen, the received authorization token, and the scope in association with each other the in the user information of the management information storage unit 91. After the authorization token registration is completed, the authorization setting process unit 75 notifies the portal service application 61 of the registration completion. In turn, the portal service application 61 prompts the display device 42 of the terminal apparatus 11 to display a screen indicating the setting result of the authorization setting.

Note that upon transmitting the authorization token to the service providing system 2, the online storage 32 may also transmit the term of validity of the authorization token and a refresh token for reissuing the authorization token in the case where the authorization token has expired, for example.

Figure 16:
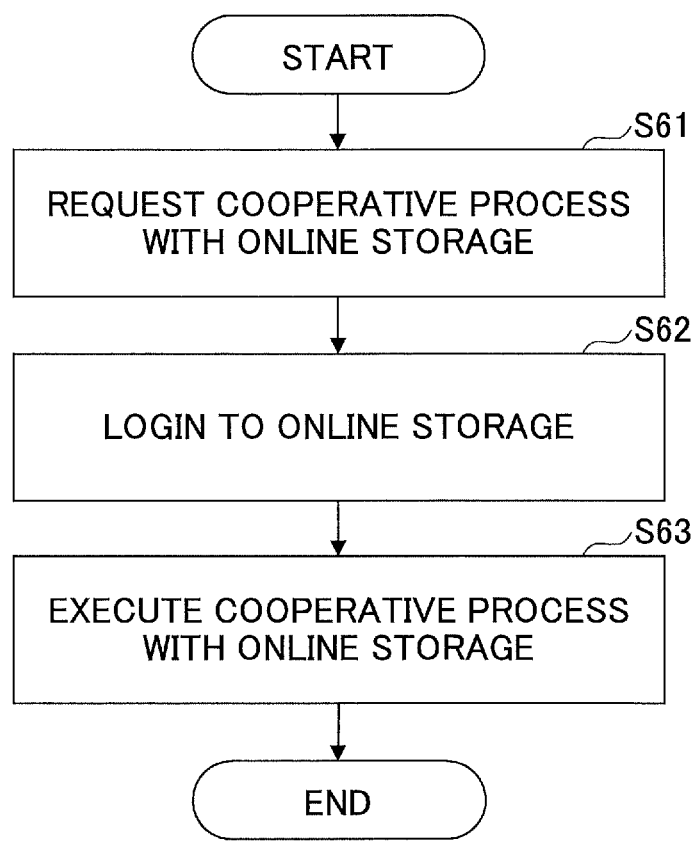
FIG. 16 is a flowchart illustrating exemplary process steps of a cooperative process with an online storage.

FIG. 16 is a flowchart illustrating an exemplary cooperative process with an online storage. In step S61, the user that has logged into the service providing system 2 issues a process request for cooperating with the online storage 32 from the terminal apparatus 11 or the image forming apparatus 12.

When the process request for cooperating with the online storage 32 is issued, in step S62, the external cooperation authentication unit 80 of the service providing system 2 performs a login process to the online storage 32.

The external cooperation authentication unit 80 receives the login request for logging into the online storage 32 from the data processing unit 84, for example. The external cooperation authentication unit 80 acquires from the user information of the management information storage unit 91, information required for the login process that is associated with the user that has logged into the service providing system 2 and the online storage 32 to which the login process is to be directed. More specifically, the external cooperation authentication unit 80 acquires the information required for the login process for logging into the online storage 32 that is associated with the tenant ID and the user ID and password for login of the user that has logged into the service providing system 2.

For example, referring to the user information of FIG. 6, when the external cooperation authentication unit 80 receives a login request for logging into "online storage A", the external cooperation authentication unit 80 acquires the account and password for the "online storage A" as the information required for the login process for logging into the "online storage A".

Further, upon receiving the login request for logging into "online storage B", the external cooperation authentication unit 80 acquires the account and authorization token for the "online storage B" as the information required for the login process for logging into the "online storage B". If the online storage 32 with which cooperation is sought corresponds to an external service that does not have the authorization setting implemented such as the "online storage A", the external cooperation authentication unit 80 uses an account and a password to make a login request to log into the "online storage A". The account and password are examples of authentication information with respect to an external service. The "online storage A" that receives the login request performs an authentication process on the received account and password. If the authentication is successful, the "online storage A" sends a response indicating login approval to the external cooperation authentication unit 80. If the authentication is unsuccessful, the "online storage A" sends a response indicating login rejection to the external cooperation authentication unit 80.

When the external cooperation authentication unit 80 receives from the "online storage A" the response indicating login approval, the service providing system 2 may be able to upload (store) data to the "online storage A" or download (acquire) data from the "online storage A", for example.

That is, by having the external cooperation authentication unit 80 receive from the online storage 32 a response indicating login approval as described above, the service providing system 2 may execute a cooperative process with the online storage 32 in step S63.

If the online storage 32 with which cooperation is sought corresponds to an external service that has the authorization setting implemented such as the "online storage B", the external cooperation authentication unit 80 uses an account and an authorization token to make a login request to log into the "online storage B". The account and authorization token are examples of authorization information with respect to an external service. The "online storage B" that receives the login request verifies the validity of the received account and authorization token. If the validity of the account and authorization token is verified, the "online storage B" sends a response indicating login approval to the external cooperation authentication unit 80. If the account and authorization token cannot be verified, the "online storage B" sends a response indicating login rejection to the external Cooperation authentication unit 80.

When the external cooperation authentication unit 80 receives from the "online storage B" the response indicating login approval, in step S63, the service providing system 2 may be able to execute a cooperative process with the online storage 32 within the limit prescribed by the scope of the authorization setting.

<<Data Output Control>>

In the following, an exemplary data output control process that may be implemented in the information processing system 1 according to the present embodiment is described. Note that the following descriptions relate to an exemplary data output control process performed in a case where "check print" is selected with respect to a print job (output request) at the image forming apparatus 12 in an office of the information processing system 1. Note that "check print" refers to test printing one copy of a plurality of copies in order to check a print result.

Figure 17B:
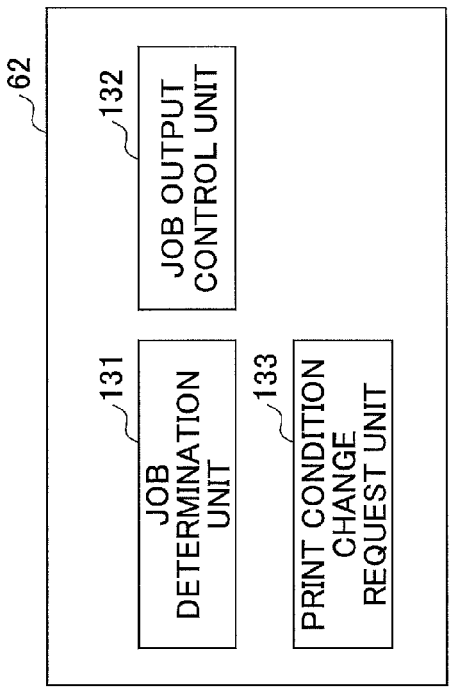
FIG. 17B illustrates an exemplary functional configuration of a print service application.
Figure 17A:
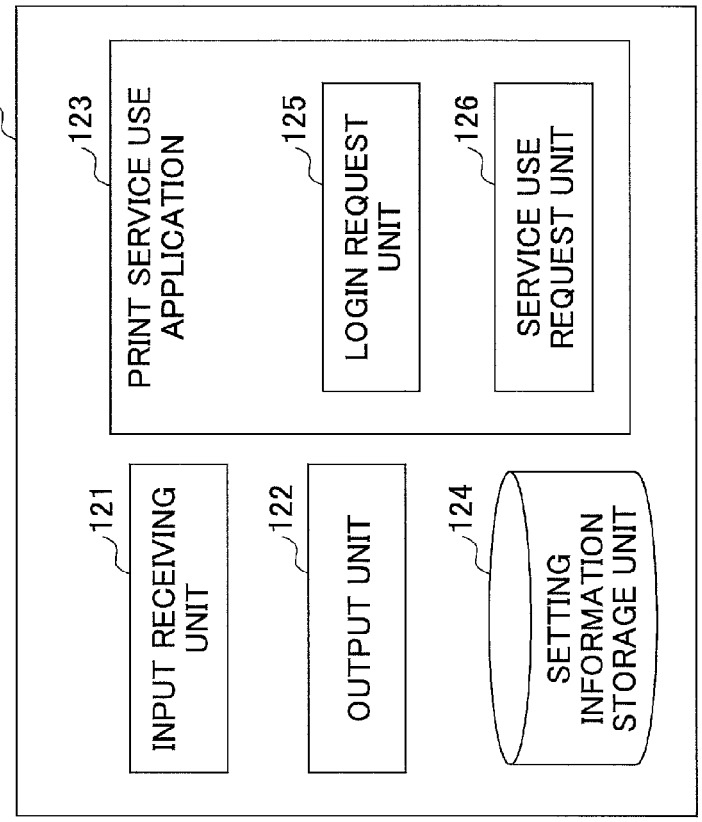
FIG. 17A illustrate exemplary functional configurations of an image forming apparatus.

FIGS. 17A and 17B illustrate exemplary functional configurations of the image forming apparatus 12 and the print service application 62. FIG. 17A is a block diagram illustrating exemplary functional elements of the image forming apparatus 12. The image forming apparatus 12 may execute relevant programs to implement the functions of an input receiving unit 121, an output unit 122, a print service use application 123, and a setting information storage unit 124.

The input receiving unit 121 receives various input operations such as a login instruction from the user. The output unit 122 outputs (e.g. prints out) the received data.

The print service use application 123 includes a login request unit 125 and a service use request unit 126. The print service use application 123 provides functions for executing a job. The login request unit 125 provides a function for logging into the service providing system 2 from the image forming apparatus 12. The login request unit 125 receives from the service providing system 2 a job list of a logged-in user.

When the service use request unit 126 receives a selection of a desired job to be executed from the job list displayed on an operation panel of the image forming apparatus 12, for example, upon receiving a selection of a desired job to run through the input receiving unit 121, the service use request unit 126 requests the service providing system 2 to execute the received job. The setting information storage unit 124 stored various setting information.

FIG. 17B is a block diagram illustrating exemplary functional elements of the print service application 62 described above. The print service application 62 may execute relevant programs to implement the functions of a job determination unit 131, a job output control unit 132, and a print condition change request unit 133.

When the job determination unit 131 receives a job execution request from the image forming apparatus 12, the job determination unit 131 determines the content of the job. For example, when the job determination unit 131 determines that the content of the job corresponds to check print for the data to be output from the image forming apparatus 12, the job determination unit 131 changes the number of copies to be printed designated in the print condition settings to one copy and requests the job output control unit 132 to output the job. The job determination unit 131 may determine whether the job content corresponds to check print based on whether a command indicating check print has been received from the service use request unit 126 of the image forming apparatus 12, for example.

After one copy of the print data has been printed by the job output control unit 132, the job determination unit 131 determines whether a print continue request to continue printing the print data resulting from the check print, for example, has been received as a job execution request from the image forming apparatus 12. If the job determination unit 131 determines that a print continue request has been received, the job determination unit 131 requests the job output control unit 132 execution request from the image forming apparatus 12, the job content judgment unit 131 changes the number of copies to be printed to a remaining number of copies obtained by subtracting one from the original number of copies set up in the print condition settings by the user, and requests the job output control unit 132 to output the job.

Further, the job determination unit 131 determines whether it has received, as a job execution request from the image forming apparatus 12, a print condition change request (e.g. print size enlargement) for the print data resulting from the check print, for example.

If the job determination unit 131 determines that it has received a print condition change request for the print data, the job determination unit 131 requests the print condition change request unit 133 to implement a change on a print condition of the print data. When the job determination unit 131 receives from the print condition change request unit 133 notification that the print condition has been changed, the job determination unit 131 changes the number of copies to be printed to the original number of copies set up by the user and requests the job output control unit 132 to output the job.

Further, the job determination unit 131 may determine whether a hold print function for retaining (not deleting) the job acquired from the image forming apparatus 12 even after the print data is printed is implemented. If the hold print function is implemented, the job determination unit 131 may request the job output control unit 132 to refrain from deleting the print data after outputting the print data.

Based on the job output request from the job determination unit 131, the job output control unit 132 controls the output of the output data by the image forming apparatus 12. The job output control unit 132 acquires from the data storage unit 93 of the management data storage unit 53 the print data of the job corresponding to the output request from the job determination unit 131 together with print conditions such as the number of copies, and outputs the acquired data to the image forming apparatus 12.

When the job output control unit 132 receives from the job determination unit 131 a request to refrain from deleting the job together with the job output request, the job output control unit 132 controls the image forming apparatus 12 to refrain from deleting the print data and save the print data in the data storage unit 93.

Upon receiving a print condition change request for the print data from the job determination unit 131, the print condition change request unit 133 acquires the corresponding print data from the data storage unit 93 and changes the print condition for the print data. For example, the printing condition change request unit 133 may request the data process control unit 81 to control the data processing unit 84 to generate changed print data according to the change to the print condition.

<<Data Output Control Process>>

Figure 18:
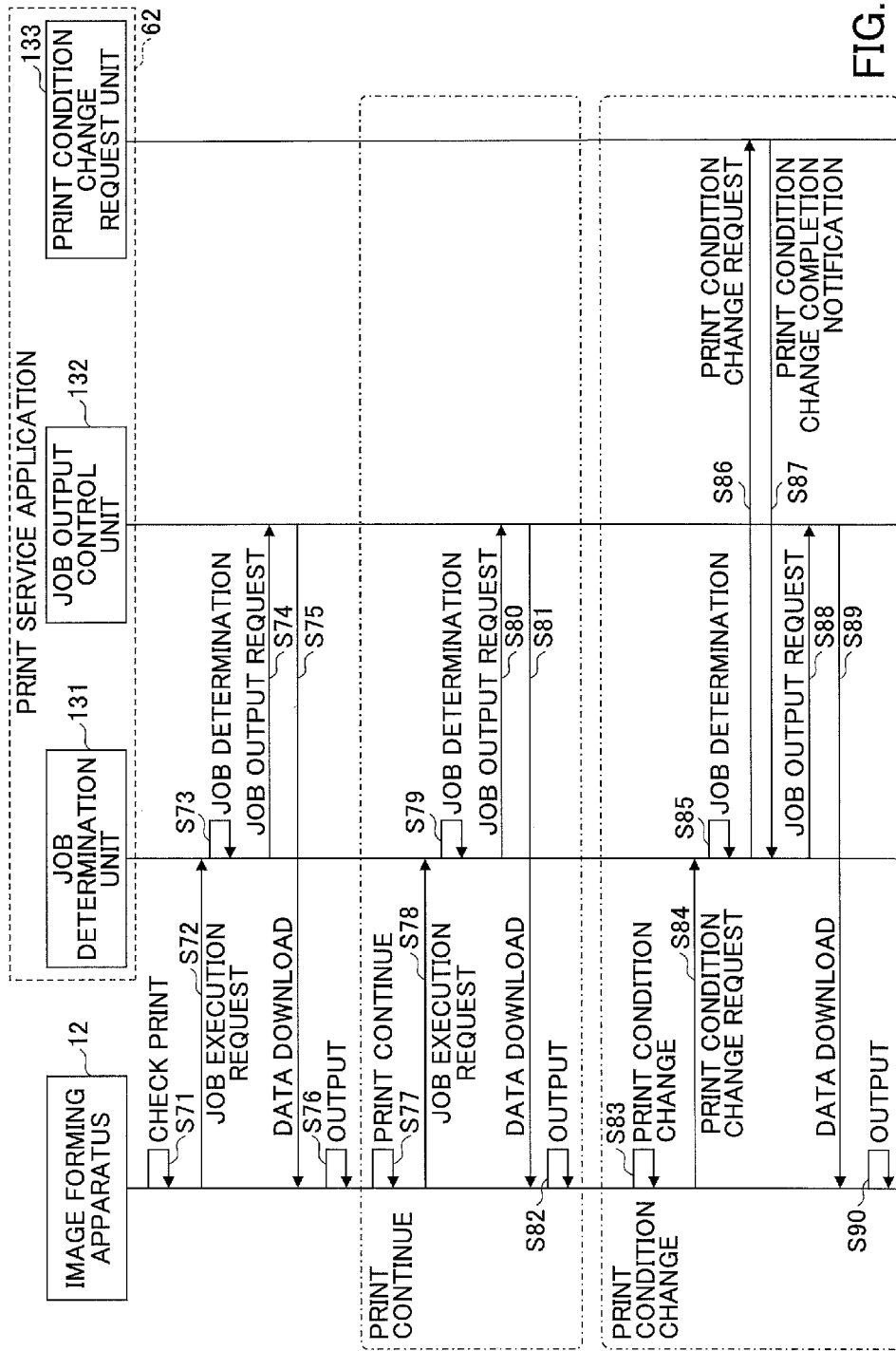
FIG. 18 is a sequence chart illustrating an exemplary print data output control process.

In the following, a data output control process executed by the above functional elements when the check print is selected by the user is described in detail. FIG. 18 is a sequence chart illustrating an exemplary print data output control process. In the example of FIG. 18, the data output control process is executed by the image forming apparatus 12 and the print service application 62.

In the example of FIG. 18, first, the image forming apparatus 12 accesses a portal site of the service providing system 2 through user operations in order to print data uploaded to the service providing system 2 using the print service application 62 of the service providing system 2.

The access control unit 72 of the service providing system 2 enables the image forming apparatus 12 to access the portal service application 61. The portal service application 61 may display a login screen on the operation panel of the image forming apparatus 12, for example.

Once the image forming apparatus 12 logs into the portal service application 61, the image forming apparatus 12 accesses the print service application 62 via the print service use application 123 according to operations on the login screen made by the user. The print service application 62 displays a job list screen for the user on the operation panel of the image forming apparatus 12.

When a job listed in the job list screen is selected by the user, the print service application 62 prompts the operation panel of the image forming apparatus 12 to display a print condition setting screen for setting print conditions for printing the selected job. The print condition setting screen may enable selection of print functions such as check print, hold print, and normal print, for example.

In step S71, when the user selects check print from the print condition setting screen, the service use request unit 126 of the image forming apparatus 12 accepts the user selection input, and in step S72, sends a job execution request to the job determination unit 131 of the print service application 62. In step S73, the job determination unit 131 determines the content of the job received from the image forming apparatus 12.

For example, if the job determination unit 131 determines that the job content corresponds to check print, in step S74, the job determination unit 131 changes the number of copies to be printed to one copy and requests the job output control unit 132 to output the job.

In step S75, the job output control unit 132 acquires from the data storage unit 93 of the management data storage unit 53 the print data of the job corresponding to the output request from the job determination unit 131, and outputs the acquired print data to the image forming apparatus 12. In step S76, the image forming apparatus 12 outputs (e.g. prints out) one copy of the print data.

In the following, a case where the user makes a print continue request to continue printing the print data resulting from the check print, and a case where the user makes a print condition change request to change print conditions of the print data resulting from the check print (e.g. print size enlargement) are separately described.

In step S77, when the user operates the operation panel to issue a continue print request with respect to the check print job output, the service use request unit 126 of the image forming apparatus 12 accepts the continue print request, and in step S78, sends a job execution request to the job determination unit 131. The service use request unit 126 of the image forming apparatus 12 may display on the operation panel of the image forming apparatus 12 a remaining number of copies obtained by subtracting one from the total number of copies originally designated by the user, for example.

In step S79, when the job determination unit 131 determines that the job content of the job from the image forming apparatus 12 corresponds to print continue to continue printing the print data, in step S80, the job determination unit 131 sends a job output request to the job output control unit 132. Here, the job determination unit 131 may change the number of copies to be printed to a remaining number of copies obtained by subtracting one from the total number of copies originally designated, and request the job output control unit 132 to output the job.

In step S81, the job output control unit 132 outputs to the image forming apparatus 12 the print data of the job in response to the output request of the job content judgment unit 131. In step S82, the image forming apparatus 12, and the remaining output number of copies obtained by subtracting a portion of print data.

On the other hand, in step S83, when the service use request unit 126 of the image forming apparatus 12 receives a user operation for changing a print condition of the print data resulting from the check print job output, in step S84, the service use request unit 126 of the image forming apparatus 12 sends a job execution request to the job determination unit 131. In this case, the service use request unit 126 of the image forming apparatus 12 may prompt the operation panel of the image forming apparatus 12 to change the number of copies displayed back to the original number of copies, for example.

In step S85, when the job determination unit 131 determines that the job content of the job from the image forming apparatus 12 corresponds to changing a print condition of the check print job output, in step S86, the job determination unit 131 sends a print condition change request for changing the print condition of the print data to the print condition change request unit 133.

In step S87, when the print condition change request unit 133 notifies the job determination unit 131 of the print condition change implemented on the print data, in step S88, the job determination unit 131 sends a job output request to the job output control unit 132. For example, the job determination unit 131 may change the number of copies to be printed to the original number of copies and request the job output control unit 132 to output the job.

In step S89, the job output control unit 132 outputs to the image forming apparatus 12 the print job data of the job corresponding to the output request from the job determination unit 131. In step S90, the image forming apparatus 12 outputs the original number of copies of the print data.

The output control processes described above relate to a case where a print continue request to continue printing the print data and a case where a print condition change request to change the print condition of the print data. In other cases, the user may select print cancel after the above step S76, for example. In this case, the image forming apparatus 12 may cancel the print operation, for example.

Also, if the user selects hold print from the print setting screen in step S71, for example, in step S72, the service use request unit 126 of the image forming apparatus 12 may output a command indicating hold print to the job determination unit 131, for example.

In this case, in step S73, based on the command, the job determination unit 131 may determine that the job content of the job execution request from the image forming apparatus 12 corresponds to hold print, and in step S74, the job determination unit 131 may send a request to the job output control unit 132 to refrain from deleting the job after outputting the job in conjunction with the job output request. Thus, in step S75, after outputting the print data to the image forming apparatus 12, the job output control unit 132 may control the image forming apparatus 12 to refrain from deleting the print data.

<<Other Print Data Output Control Process Example>>

In the output control process of FIG. 18, the print service application 62 of the service providing system 2 acquires a command from the image forming apparatus 12 indicating a desired print function such as check print, and the print service application 62 determines the job content and executes an output control process according to the determined job content. However, the present invention is not limited to such an example.

Figure 19:
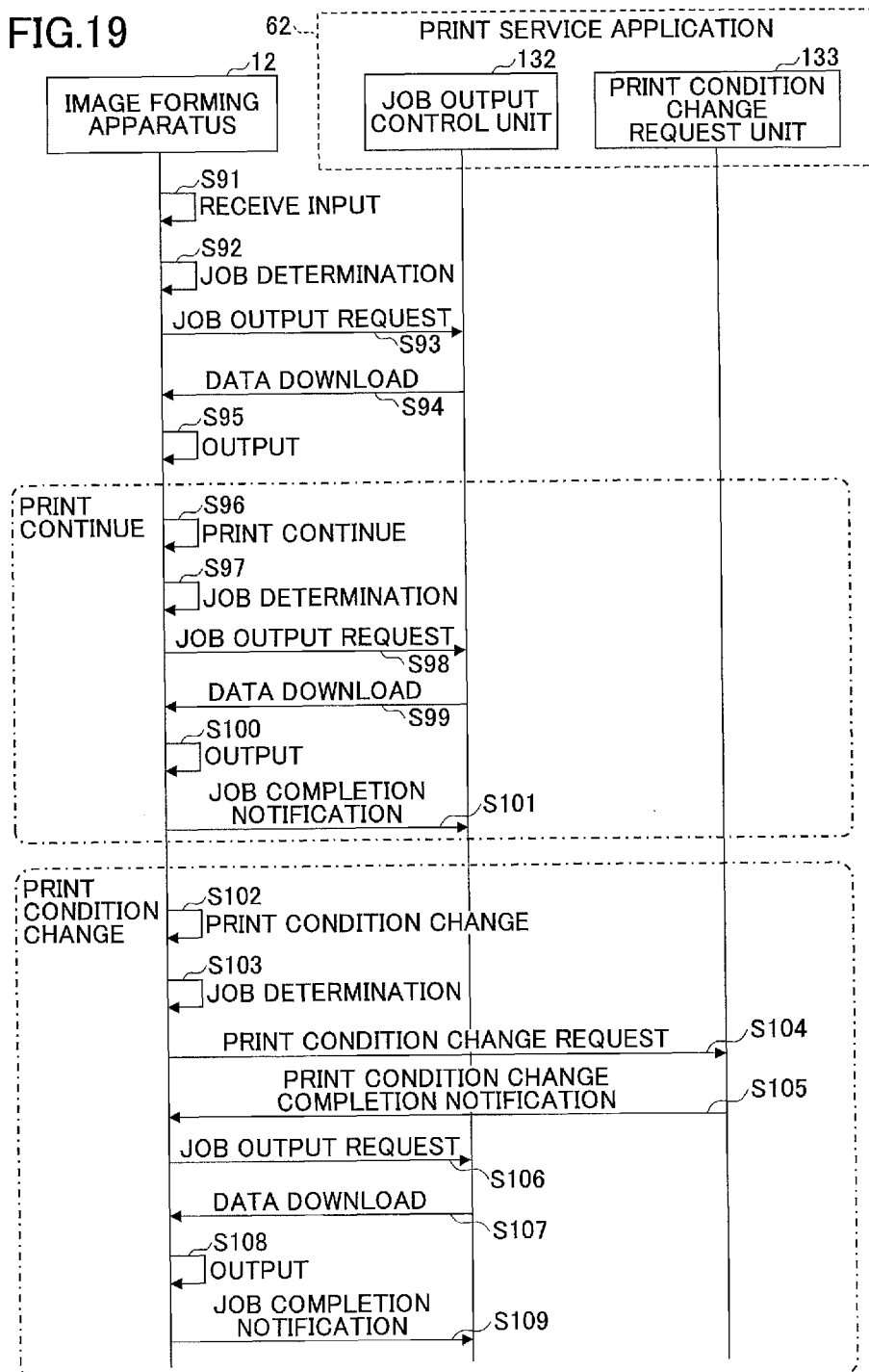
FIG. 19 is a sequence chart illustrating another exemplary print data output control process.

In another exemplary print data output control process, the function of the job determination unit 131 of the print service application 62 may be implemented at the image forming apparatus 12, for example. FIG. 19 is a sequence chart illustrating another exemplary print data output control process.

In the example of FIG. 19, in step S91, the image forming apparatus 12 accepts information input by the user from a print condition setting screen, for example. In step S92, the image forming apparatus 12 determines the job content based on the information input in step S91. At this point, the image forming apparatus 12 may determine whether the job content corresponds to check print, for example.

In step S93, upon determining that the job content corresponds to check print, the image forming apparatus 12 changes the number of copies to be printed to one copy and requests the job output control unit 132 of the print service application 62 to output the job.

In step S94, the job output control unit 132 acquires from the data storage unit 93 of the management data storage unit 53 the print data of the job corresponding to the output request from the image forming apparatus 12 and outputs the acquired data to the image forming apparatus 12. In step S95, the image forming apparatus 12 outputs (e.g. prints out) one copy of the print data.

In the following, a case where the user issues a print continue request to continue printing the print data resulting from check print and a case where the user issues a print condition change request for changing the print condition of the print data (e.g. print size enlargement) are separately described.

In step S96, the image forming apparatus 12 accepts a print continue request to continue printing the print data resulting from the check print as a user operation, for example. In step S97, upon determining that the job content corresponds to print continue, in step S98, the image forming apparatus 12 changes the number of copies to be printed to a remaining number of copies obtained by subtracting one from the original total number of copies, and requests the job output control unit 132 to output the job. Here, the image forming apparatus 12 may control the operation panel to display the remaining number of copied obtained by subtracting one from the original total number of copies as the number of copies to be printed, for example.

In step S99, the job output control unit 132 outputs to the image forming apparatus 12 the print data of the job corresponding to the output request from the image forming apparatus 12. In step S100, the image forming apparatus 12 outputs the remaining number of copies of the print data, and in step S101, the image forming apparatus 12 outputs a job completion notification to the job output control unit 132.

In some embodiments, the image forming apparatus 12 may save a file of the print data of the job acquired from the job output control unit 132 upon executing the check print, and when print continue is selected in the manner described above, the image forming apparatus 12 may output the saved print data. In this way, the output speed may be increased upon outputting the job according to the print continue request, for example.

On the other hand, in step S102, the image forming apparatus 12 accepts a print condition change request to change the print condition of the print data as a user operation, for example. In step S103, upon determining that the job content corresponds to changing the print condition of the print data, in step S104, the image forming apparatus 12 requests the print condition change request unit 133 to change the print condition of the print data. Here, the image forming apparatus 12 may control the operation panel to display to the original number of copies as the number of copies to be printed, for example.

In step S105, upon acquiring from the print condition change request unit 133 a change notification indicating that the print condition has been changed, in step S106, the image forming apparatus 12 requests the job output control unit 132 to output the job. Here, the image forming apparatus 12 may change the number of copies to be printed to the original number of copies and request the job output control unit 132 to output the original number of copies of the print data, for example.

In step S107, upon acquiring from the job output control unit 132 the print data of the job corresponding to the output request, in step S108, the image forming apparatus 12 outputs the original number of copies of the print data. Also, in step S109, the image forming apparatus 12 outputs a job completion notification to the job output control unit 132.

Note that if the image forming apparatus 12 determines in step S91 that hold print has been selected by the user, for example, the image forming apparatus 12 may refrain from sending the job completion notification to the job output control unit 132 in order to prevent the job from being deleted. In another example, the image forming apparatus 12 may send a command including a request to refrain from deleting the print job upon sending the job completion notification to the job output control unit 132. Note, however, that the present invention is not limited to these examples.

According to an aspect of the present embodiment, user convenience may be improved upon outputting data in a system that manages services and service providing destinations.

<<Print Data Preview Image Generation and Display Process>>

In the following, a process of generating and displaying a preview image of print data in the information processing system 1 according to the present embodiment is described.

Figure 20:
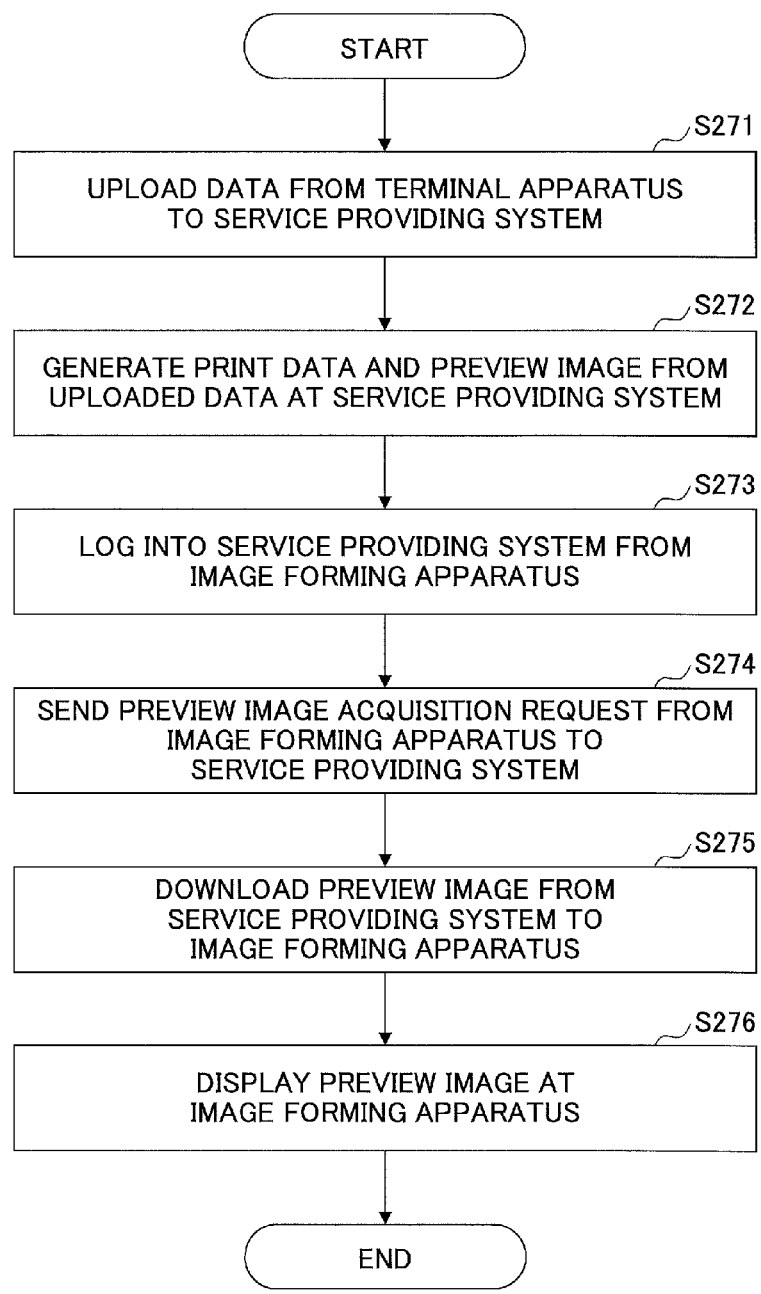
FIG. 20 is a flowchart illustrating an exemplary process of generating and displaying a preview image of print data.

FIG. 20 is a flowchart illustrating an exemplary process of generating a preview image of print data and displaying the generated preview image at the image forming apparatus 12.

First, a user wishing to use a print service provided by the service providing system 2 operates the input device 41 of the terminal apparatus 11 to access a portal site of the service providing system 2. Based on the user operation, the terminal apparatus 11 accesses the portal site of the service providing system 2.

The access control unit 72 of the service providing system 2 allows access from the terminal device 11 to the portal service application 61.

The portal service application 61 prompts the display device 42 of the terminal apparatus 11 to display a top screen. The user operates the input device 41 of the terminal apparatus 11 to make a login request from the top screen. The user, that has logged into the portal service application 61 may be able to access the print service application 62. To access the print service application 62 of the service providing system 2, the user operates the input device 41 of the terminal apparatus 11. Based on the user operation, the terminal apparatus 11 accesses the print service application 62 of the service providing system 2.

In step S271, the print service application 62 prompts the display device 42 of the terminal apparatus 11 to display an upload screen. By operating the input device 41 of the terminal apparatus 11, the user uploads data to be printed from the upload screen to the print service application 62 of the service providing system 2. The print service application 62 stores the data uploaded from the terminal apparatus 11 (uploaded data) in the data storage unit 93 in association with the logged-in user.

In step S272, the print service application 62 generates print data and a preview image of the print data from the uploaded data. Note that the process of step S272 is described in detail below.

A user wishing to print the uploaded data operates the operation panel of the image forming apparatus 12 to access the service providing system 2. Based on the user operation, the image forming apparatus 12 accesses the service providing system 2.

The access control unit 72 of the service providing system 2 enables the image forming apparatus 12 to access the portal service application 61. The portal service application 61 may prompt the operation panel of the image forming apparatus 12 to display a login screen, for example.

In step S273, the user operates the operation panel of the image forming apparatus 12 to make a login request from the login screen. The user that has logged into the portal service application 61 may be able to access to the print service application 62. To access the print service application 62 of the service providing system 2, the user operates the operation panel of the image forming apparatus 12. Based on the user operation, the image forming apparatus 12 accesses the print service application 62 of the service providing system 2.

In step S274, the print service application 62 prompts the operation panel of the image forming apparatus 12 to display an uploaded data list screen, for example. Here, it is assumed that the uploaded data list screen includes a preview image display button. By pressing the preview image display button of the uploaded data list screen, the user may request the image forming apparatus 12 to display a preview image of print data.

When the preview image display button is pressed, the image forming apparatus 12 sends a preview image acquisition request to the print service application 62. In step S275, the print service application 62 acquires from the storage unit 93 the requested preview image of the preview image acquisition request from the image forming apparatus 12 and downloads the acquired preview image to the image forming apparatus 12.

In step S276, the image forming apparatus 12 displays the downloaded preview image on the operation panel. In this way, a preview image of print data may be generated at the service providing system 2 and the generated preview image may be downloaded to and displayed at the image forming apparatus 12.

Note that FIG. 20 illustrates an example where a preview image of print data is generated asynchronously after the data is uploaded. However, in other examples, the process from uploading data to generating a preview image of print data may be executed at the time the preview image display button is pressed by the user.

Also, in the example of FIG. 20, the preview image is displayed after the preview image display button is pressed by the user. However, in other examples, a small preview image may be generated in advance and displayed as a thumbnail image in the uploaded data list screen.

Also, in generating the print data and the preview image of the print data from the uploaded data in step S272, the print service application 62 may prompt the data processing unit 84 to execute a data process of generating the preview image of the print data. In this case, the data process of generating a preview image of print data may be one of the specific processes of data processes that may be executed by the one or more data processing units 84.

Further, in the case where a small preview image is generated in advance and displayed as a thumbnail image in the uploaded data list screen, the print service application 62 may have the data processing unit 84 execute a data process of generating the small preview image of print data. In this case, the data process of generating the small preview image of print data may be one of the specific processes of the data processes that may be executed by the one or more data processing units 84.

Note that in the case of generating a preview image of print data at the time the preview image display button is pressed by the user, the preview has to be generated within a short period of time and promptly transmitted to the image forming apparatus 12. Therefore, in the case of generating the preview image at the time the preview image display button is pressed, the print service application 62 generates the preview image of print data.

Figure 21:
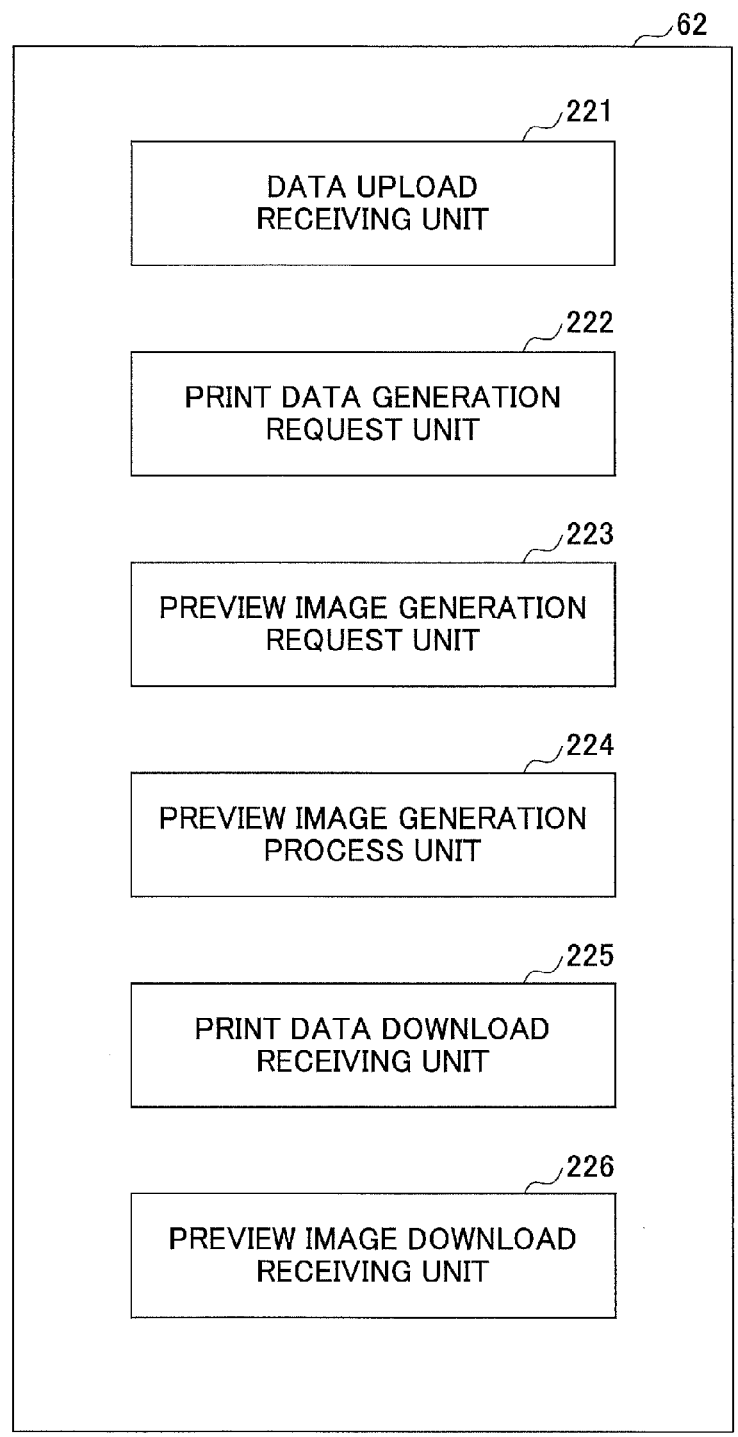
FIG. 21 is a sequence chart illustrating an example of a user authentication process.

To execute the process of generating the preview image of print data as described above, the print service application 62 may have a functional configuration as illustrated in FIG. 21, for example. FIG. 21 is a block diagram illustrating exemplary functional components of the print service application 62.

In FIG. 21, the print service application 62 includes a data upload receiving unit 221, a print data generation request unit 222, a preview image generation request unit 223, a preview image generation process unit 224, a print data download receiving unit 225, and a preview image download receiving unit 226.

The data upload receiving unit 221 displays an upload screen on the display device 42 of the terminal apparatus 11 and receives a data upload from the terminal apparatus 11. The print data generation request unit 222 issues a process request to the data processing control unit 81 to have the data processing unit 84 execute a data process of generating print data. The preview image generation request unit 223 issues a process request to the data process control unit 81 to have the data processing unit 84 execute a data process of generating a preview image of print data.

In a case where a preview image of print data is to be generated at the time the user presses the preview image display button, for example, the preview image generation process unit 224 may generate the preview image of print data. The print data download receiving unit 225 displays an uploaded data list screen on the operation panel of the image forming apparatus 12, for example, and receives a download request for print data from the image forming apparatus 12. Further, the print data download receiving unit 225 downloads the requested print data of the download request to the image forming apparatus 12.

The preview image download receiving unit 226 receives a preview image acquisition request from the image forming apparatus 12 when the preview image display button of the uploaded data list screen is pressed. Then, the preview image download receiving unit 126 downloads the requested preview image of the acquisition request to the image forming apparatus 12.

In the information processing system 1 according to the present embodiment, services to be provided, users using the services, and devices using the services may be appropriately managed, and a preview image of print data may be generated and displayed.

Further, the present invention is not limited to the specific embodiments described herein, and variations and modifications may be made without departing from the spirit and scope of the present invention.

Note that the terminal apparatus 11 and the image forming apparatus 12 are exemplary embodiments of a service using apparatus of the present invention. The user authentication unit 77 and the user device authentication unit 78 are exemplary embodiments of an authentication unit of the present invention. The portal service application 61 is an exemplary embodiment of a service identification unit of the present invention. The print service application 62, the data process control unit 81, the process queues 82, the data process request units 83, and the data processing units 84 are exemplary embodiments of an execution unit of the present invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data.

The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese Patent Application No. 2013-155172, filed on Jul. 26, 2013, and Japanese Patent Application No. 2013-156050, filed on Jul. 26, 2013, the entire contents of which are hereby incorporated herein by reference.

What is claimed is:

1. A service providing system that includes one or more information processing apparatuses and is configured to provide a service to a service using apparatus connected to the service providing system via a network, the service providing system comprising:

a management information storage unit configured to store management information including an association between service identification information of the service, user identification information of a user using the service, and device identification information of the service using apparatus;

an authentication unit configured to execute an authentication process using authentication information acquired from the service using apparatus, the authentication information including at least one of user authentication information used for user authentication and device authentication information used for device authentication;

a service identification unit configured to identify the service associated with the authentication information based on the management information and the authentication information that has been authenticated by the authentication unit; and an execution unit configured to execute a process according to a use request for the service identified by the service identification unit upon acquiring the use request for the service from the service using apparatus;

wherein the execution unit determines a content of a predetermined output request acquired from the service using apparatus and controls output of data according to the output request; and wherein the execution unit includes:
a receiving unit configured to receive data to be processed from a first service using apparatus;
an image data generation unit configured to generate image data from the received data; and
an image data providing unit configured to provide the image data to a second service using apparatus based on an acquisition request for the image data from the second service using apparatus.

2. The service providing system according to claim 1, wherein the execution unit determines whether to change a number of print copies set up for the data based on the content of the output request.

3. The service providing system according to claim 1, wherein after the execution unit controls a predetermined number of print copies of the data to be output from the service using apparatus, the execution unit controls output of the data, according to a request from the user, by outputting a remaining number of print copies of the data obtained by subtracting the predetermined number of print copies from a total number of print copies, or by changing a print condition of the data and outputting the data.

4. The service providing system according to claim 1, wherein the image data generation unit generates the image data from the received data after the image data providing unit acquires the acquisition request for the image data from the second service using apparatus.

5. The service providing system according to claim 1, wherein the execution unit includes
 a print data generation unit configured to generate print data from the received data; and
 a print data providing unit configured to provide a list of the print data generated by the print data generation unit to the second service using apparatus and receive an acquisition request for the print data from the second service using apparatus, the print data providing unit being configured to display the image data generated by the image data generation unit in the list of the print data.

6. The service providing system according to claim 1, wherein the image data includes a preview image.

7. The service providing system according to claim 1, further comprising:
 a license information storage unit configured to store license information including an association between first service identification information of the service identification information and registration information, the first service identification information identifying a first service and including a license for the first service, and the registration information being used for registering the first service identification information as the service to be provided;
 a license authentication unit configured to receive a registration request including the first service identification information and the registration information, and execute a license authentication process based on the license information and the first service identification information and the registration information included in the received registration request; and
 a setting registration unit configured to register the received first service identification information as the service to be provided in the management information when a validity of the received registration request is verified by the license authentication unit.

8. The service providing system according to claim 1, wherein
 the management information storage unit stores first user identification information and second user identification information as the user identification information of a user logging into the service using apparatus;
 when the authentication unit acquires from the service using apparatus first user authentication information as the user authentication information used for user authentication, the authentication unit executes a user authentication process based on the first user authentication information and the first user identification information; and
 when the authentication unit acquires from the service using apparatus second user authentication information as the user authentication information used for user authentication, the authentication unit executes the user authentication process based on the second user authentication information and the second user identification information.

9. The service providing system according to claim 1, wherein
 the management information storage unit stores third user authentication information as the user authentication information of a user logging into an external service connected to the service providing system via a network; and
 when the process according to the use request for the service includes a cooperative process with the external service, the execution unit executes a login process for logging into the external service based on the third user authentication information of the user that has been authenticated by the authentication unit.

10. The service providing system according to claim 1, further comprising:
 an execution request storage unit configured to store execution request information of the process according to the use request for the service, the execution request information being stored according to a specific process of the process;
 a data process control unit configured to register the execution request information in the execution request information storage unit according to the specific process in response to the use request for the service; and
 a plurality of data processing units configured to execute a data process corresponding to the specific process according to the execution request information stored in the execution request information storage unit;
 wherein when there is a next data process to be executed after execution of the data process, the data processing units register execution request information of the next data process in the execution request information storage unit according to a specific process of the next data process.

11. The service providing system according to claim 10, wherein the plurality of data processing units include a data processing unit configured to execute a data process of generating a plurality of sets of execution request information according to the execution request information stored in the execution request information storage unit and registering the generated execution request information in the execution request information storage unit as the execution request information of the next data process.

12. A service providing method executed in a service providing system that includes one or more information processing apparatuses and is configured to provide a service to a service using apparatus connected to the service providing system via a network, the service providing method comprising:
 a management information storage step of storing management information including an association between service identification information of the service, user identification information of a user using the service, and device identification information of the service using apparatus;
 an authentication step of executing an authentication process using authentication information acquired from the service using apparatus, the authentication information including at least one of user authentication information used for user authentication and device authentication information used for device authentication;
 a service identification step of identifying the service associated with the authentication information based on the management information and the authentication information that has been authenticated in the authentication step; and an execution step of executing a process according to a use request for the service identified in the service identification step upon acquiring the use request for the service from the service using apparatus;

wherein the execution step includes determining a content of a predetermined output request acquired from the service using apparatus and controlling output of data according to the output request; and wherein the execution step includes:
- a receiving step of receiving data to be processed from a first service using apparatus;
- an image data generating step of generating image data from the received data; and
- an image data providing step of providing the image data to a second service using apparatus based on an acquisition request for the image data from the second service using apparatus.

13. A non-transitory computer-readable medium having a program stored thereon that is executable by a service providing system including one or more information processing apparatuses and being configured to provide a service to a service using apparatus connected to the service providing system via a network, the program, when executed, causing the service providing system to perform a service providing method comprising:

a management information storage step of storing management information including an association between service identification information of the service, user identification information of a user using the service, and device identification information of the service using apparatus;

an authentication step of executing an authentication process using authentication information acquired from the service using apparatus, the authentication information including at least one of user authentication information used for user authentication and device authentication information used for device authentication;

a service identification step of identifying the service associated with the authentication information based on the management information and the authentication information that has been authenticated in the authentication step; and an execution step of executing a process according to a use request for the service identified in the service identification step upon acquiring the use request for the service from the service using apparatus;

wherein the service using apparatus determines a content of a predetermined output request and outputs data acquired by the execution step; and wherein the execution unit includes:
- a receiving unit configured to receive data to be processed from a first service using apparatus;
- an image data generation unit configured to generate image data from the received data; and
- an image data providing unit configured to provide the image data to a second service using apparatus based on an acquisition request for the image data from the second service using apparatus.

14. The service providing method according to claim 12, wherein the image data generation step includes generating the image data from the received data after the image data providing step of acquiring the acquisition request for the image data from the second service using apparatus.

15. The service providing method according to claim 12, wherein the execution step includes
- a print data generation step of generating print data from the received data; and
- a print data providing step of providing a list of the print data generated by the print data generation step to the second service using apparatus, receiving an acquisition request for the print data from the second service using apparatus and displaying the image data generated by the image data generation step in the list of the print data.

16. The service providing method according to claim 12, wherein the image data generating step includes generating image data including a preview image.

17. The service providing method according to claim 12, further comprising:

a license information storage step of storing license information including an association between first service identification information of the service identification information and registration information, the first service identification information identifying a first service and including a license for the first service, and the registration information being used for registering the first service identification information as the service to be provided;

a license authentication step of receiving a registration request including the first service identification information and the registration information, and executing a license authentication process based on the license information and the first service identification information and the registration information included in the received registration request; and a setting registration step of registering the received first service identification information as the service to be provided in the management information when a validity of the received registration request is verified by the license authentication step.

18. The service providing method according to claim 12, wherein
the management information storage step includes storing third user authentication information as the user authentication information of a user logging into an external service connected to the service providing system via a network; and when the process according to the use request for the service includes a cooperative process with the external service, the execution step includes executing a login process for logging into the external service based on the third user authentication information of the user that has been authenticated by the authentication step.

19. The service providing method according to claim 12, further comprising:

an execution request storage step of storing execution request information of the process according to the use request for the service, the execution request information being stored according to a specific process of the process;

a data process control step of registering the execution request information in the execution request information storage step according to the specific process in response to the use request for the service; and a plurality of data processing steps of executing a data process corresponding to the specific process according to the execution request information stored in the execution request information storage step;

wherein when there is a next data process to be executed after execution of the data process, the data processing steps include registering execution request information of the next data process in the execution request information storage step according to a specific process of the next data process.

20. The service providing method according to claim 19, wherein the plurality of data processing steps include a data processing step of executing a data process of generating a plurality of sets of execution request information according to the execution request information stored in the execution request information storage step and registering the generated execution request information in the execution request information storage step as the execution request information of the next data process.

* * * * *